US008165043B2

(12) United States Patent
Di Benedetto et al.

(10) Patent No.: US 8,165,043 B2
(45) Date of Patent: Apr. 24, 2012

(54) MULTIPLE INSTANCE SPANNING TREE PROTOCOL

(75) Inventors: Marco Di Benedetto, Santa Clara, CA (US); Ramana Mellacheruvu, San Jose, CA (US); Norman W. Finn, Livermore, CA (US); Umesh Mahajan, Cupertino, CA (US)

(73) Assignee: Cisco Technology, Inc., San Jose, CA (US)

( * ) Notice: Subject to any disclaimer, the term of this patent is extended or adjusted under 35 U.S.C. 154(b) by 1426 days.

(21) Appl. No.: 11/185,057

(22) Filed: Jul. 20, 2005

(65) Prior Publication Data

US 2005/0259597 A1 Nov. 24, 2005

Related U.S. Application Data

(63) Continuation of application No. 09/690,619, filed on Oct. 17, 2000, now Pat. No. 6,937,576.

(51) Int. Cl.
*H04L 12/28* (2006.01)
(52) U.S. Cl. .................. 370/256; 370/254; 370/395.53; 370/402
(58) Field of Classification Search .................. 370/402, 370/395, 256
See application file for complete search history.

(56) References Cited

U.S. PATENT DOCUMENTS

| 4,706,080 | A | | 11/1987 | Sincoskie |
| 4,811,337 | A | | 3/1989 | Hart |
| 5,150,360 | A | * | 9/1992 | Perlman et al. ............... 370/402 |
| 5,394,402 | A | | 2/1995 | Ross |
| 5,734,824 | A | * | 3/1998 | Choi ............................ 709/224 |
| 5,742,604 | A | | 4/1998 | Edsall et al. |
| 5,761,435 | A | | 6/1998 | Fukuda et al. |
| 5,825,772 | A | * | 10/1998 | Dobbins et al. ............... 370/396 |
| 5,878,232 | A | | 3/1999 | Marimuthu |
| 5,959,989 | A | * | 9/1999 | Gleeson et al. ............... 370/390 |
| 6,188,694 | B1 | * | 2/2001 | Fine et al. ..................... 370/402 |
| 6,801,506 | B1 | | 10/2004 | Dey |
| 6,985,449 | B2 | * | 1/2006 | Higashiyama ................ 370/256 |
| 7,428,237 | B1 | * | 9/2008 | Gai et al. .................. 370/395.53 |
| 2006/0075498 | A1 | * | 4/2006 | Yeom ............................ 726/23 |

OTHER PUBLICATIONS

Chamber, May 1999, "Draft supplement to virtula Bridged Local Area Networks: Multiple Spanning Trees".*
Fine et al., "Shared Spanning Trees", Cisco Systems, Jan. 15, 1999, pp. 1-30.
Finn, Norman, "Shared Spanning Trees IEEE 802.1s Multiple Spanning Trees for .1q," Cisco Systems, Jan. 27, 1999, pp. 1-11.
"ISO/IEC 15802-3: 1998 ANSI/IEEE Std. 802.1d," IEEE, 1998, pp. 58-109.
"Draft Standard for Virtual Bridged Local Area Networks," IEEE P802.1Q/D2, LAN MAN Stnadards Committee of the IEE Computer Society, Aug. 30, 1996.

(Continued)

*Primary Examiner* — Man Phan
*Assistant Examiner* — Pamit Kaur
(74) *Attorney, Agent, or Firm* — Cesari and McKenna, LLP

(57) ABSTRACT

A multiple instance spanning tree protocol (MI-STP) creates a plurality of active topologies (i.e., loop-free paths) within a computer network. These active topologies may be established through the exchange and processing of multiple instance spanning tree bridge protocol data unit messages (MI-STP BPDUs) by the intermediate network devices within the network. The active topologies are preferably created independently of any virtual local area network (VLAN) designations defined within the network. Once the active topologies are defined, each VLAN designation is then mapped to a single active topology, although multiple VLAN designations are preferably mapped to the same active topology to provide load balancing.

24 Claims, 10 Drawing Sheets

OTHER PUBLICATIONS

"Draft Standard P802.1Q/D7 IEEE Standards for Local and Metropolitan Area Networks: Virtual Bridged Local Area Networks," IEEE P802.1Q/D7, LAN MAN Standards Committee of the IEEE Computer Society, Oct. 3, 1997, Institute of Electrical and Electronics Engineers, Inc., New York, NY.

"Draft Standard P802.1Q/D10 IEEE Standards for Local and Metropolitan Area Networks: Virtual Bridged Local Area Networks," IEEE P802.1Q/D10, LAN MAN Standards Committee of the IEEE Computer Society, Mar. 22, 1998 Institute of Electrical and Electronics Engineers, Inc., New York, NY.

"Draft Supplement to Virtual Bridged Local Area Networks: Multiple Spanning Trees" IEEE p802.1s/D2, LAN MAN Standards Committee of the IEEE Computer Society, 1999, Institute of Electrical and Electronics Engineers, Inc., New York, NY.

"Understanding VLAN Truck Protocol", http://www.cisco.com/univered/home/home.htm, Cisco Systems, Inc., (c) 1997, pp. 1-2.

"White Paper: VLAN Truck Protocol", http:www.cisco.com/warp/public/473/21.html, Cisco Systems, Inc., (c)2000, pp. 1-22.

"Multiple Spanning Trees", IEEE P802.1s/D6, Draft Supplement to Virtual Bridged Local Area Networks: Institute of Electrical and Electronics Engineers, Inc., pp. 1-44, Jun. 8, 2000.

"Standards for Local and Metropolitan Area Networks—Supplement to 802,1Q Virtual Bridged Local Area Networks: Multiple Spanning Trees", IEEE Draft P802.1s/D8, pp. 1-50, Sep. 27, 2000.

* cited by examiner

322

| STP INSTANCE ID | SPANNING TREE INFORMATION | VLAN MAPPING | |
| --- | --- | --- | --- |
| | | REVISIONS | VLANS |
| 1 | ROOT, ROOT, PORT, ... | 2 | NULL |
| 2 | ROOT, ROOT, PORT, ... | 6 | B |
| 3 | ROOT, ROOT, PORT, ... | 3 | G,Y |
| 4 | ROOT, ROOT, PORT, ... | 1 | O |
| 5 | ROOT, ROOT, PORT, ... | 15 | V |
| 6 | ROOT, ROOT, PORT, ... | 7 | R |
| ⋮ | | | |
| 15 | ROOT, ROOT, PORT, ... | 9 | P |
| 16 | ROOT, ROOT, PORT, ... | 21 | M |

| VLAN DESIGNATION (604) | SPANNING TREE INSTANCE (606) | |
|---|---|---|
| 1 | NULL | ~602 |
| 2 | 6 | ~602 |
| 3 | 12 | ~602 |
| 4 | 12 | ~602 |
| 5 | 12 | ~602 |
| 6 | 3 | ~602 |
| ⋮ | ⋮ | |
| 4092 | 8 | ~602 |
| 4093 | 8 | ~602 |
| 4094 | 12 | ~602 |
| 4095 | 4 | ~602 |

FIG. 6

MULTIPLE INSTANCE SPANNING TREE PROTOCOL

CROSS-REFERENCE TO RELATED APPLICATIONS

This application is a continuation and claims the benefit of U.S. patent application Ser. No. 09/690,619, filed Oct. 17, 2000 now U.S. Pat. No. 6,937,576.

This application is related to the following co-pending, commonly owned U.S. Patent Applications:

U.S. patent application Ser. No. 08/997,297 entitled SHARED SPANNING TREE PROTOCOL, filed Dec. 23, 1997; and U.S. patent application Ser. No. 09/283,111 entitled METHOD AND APPARATUS FOR PROVIDING FAST SPANNING TREE RE-STARTS, filed Mar. 31, 1999.

BACKGROUND OF THE INVENTION

1. Field of the Invention

The present invention relates generally to computer networks and, more specifically, to a protocol for defining multiple instances of loop-free paths within a computer network.

2. Background Information

Many organizations, including businesses, governments and educational institutions, utilize computer networks so that employees and others may share and exchange information and/or resources. A computer network typically comprises a plurality of entities interconnected by means of one or more communications media. An entity may consist of any device, such as a computer, that "sources" (i.e., transmits) or "sinks" (i.e., receives) data frames over the communications media. A common type of computer network is a local area network ("LAN") which typically refers to a privately owned network within a single building or campus. LANs typically employ a data communication protocol (LAN standard), such as Ethernet, FDDI or token ring, that defines the functions performed by data link and physical layers of a communications architecture (i.e., a protocol stack). In many instances, several LANs may be interconnected by point-to-point links, microwave transceivers, satellite hook-ups, etc. to form a wide area network ("WAN") or internet that may span an entire country or continent.

One or more intermediate devices is often used to couple LANs together and allow the corresponding entities to exchange information. For example, a switch may be utilized to provide a "switching" function for transferring information, such as data frames, among entities of a computer network. Typically, the switch is a computer and includes a plurality of ports that couple the switch to the other entities. The switching function includes receiving data at a source port from an entity and transferring that data to at least one destination port for receipt by another entity.

In addition, most computer networks include redundant communications paths so that a failure of any given link does not isolate any portion of the network. Such networks are typically referred to as meshed or partially meshed networks. The existence of redundant links, however, may cause the formation of circuitous paths or "loops" within the network. Loops are highly undesirable because data frames may traverse the loops indefinitely.

Furthermore, some devices, such as bridges or switches, replicate frames whose destination is not known resulting in a proliferation of data frames along loops. The resulting traffic effectively overwhelms the network. Other intermediate devices, such as routers, that operate at higher layers within the protocol stack, such as the Internetwork Layer of the Transmission Control Protocol/Internet Protocol ("TCP/IP") reference model, deliver data frames and learn the addresses of entities on the network differently than most bridges or switches, such that routers are generally not susceptible to sustained looping problems.

Spanning Tree Algorithm

To avoid the formation of loops, most bridges and switches execute a spanning tree algorithm which allows them to calculate an active network topology that is loop-free (i.e., a tree) and yet connects every pair of LANs within the network (i.e., the tree is spanning). The Institute of Electrical and Electronics Engineers (IEEE) has promulgated a standard (the 802.1D standard) that defines a spanning tree protocol to be executed by 802.1D compatible devices. In general, by executing the IEEE spanning tree protocol, bridges elect a single bridge to be the "root" bridge. Since each bridge has a unique numerical identifier (bridge ID), the root is typically the bridge with the lowest bridge ID. In addition, for each LAN coupled to more than one bridge, only one (the "designated bridge") is elected to forward frames to and from the respective LAN. The designated bridge is typically the one closest to the root. Each bridge also selects one port (its "root port") which gives the lowest cost path to the root. The root ports and designated bridge ports are selected for inclusion in the active topology and are placed in a forwarding state so that data frames may be forwarded to and from these ports and thus onto the corresponding paths or links of the network. Ports not included within the active topology are placed in a blocking state. When a port is in the blocking state, data frames will not be forwarded to or received from the port. A network administrator may also exclude a port from the spanning tree by placing it in a disabled state.

To obtain the information necessary to run the spanning tree protocol, bridges exchange special messages called configuration bridge protocol data unit (BPDU) messages. FIG. 1 is a block diagram of a conventional BPDU message 100. The BPDU message 100 includes a header 102 compatible with the Media Access Control (MAC) layer of the respective LAN standard. The header 102 comprises a destination address (DA) field 104, a source address (SA) field 106, a Destination Service Access Point (DSAP) field 108, and a Source Service Access Point (SSAP) 110, among others. The DA field 104 carries a unique bridge multicast destination address assigned to the spanning tree protocol, and the DSAP and SSAP fields 108, 110 carry standardized identifiers assigned to the spanning tree protocol. Appended to header 102 is a BPDU message area 112 that also contains a number of fields, including a Topology Change Acknowledgement (TCA) flag 114, a Topology Change (TC) flag 116, a root identifier (ROOT ID) field 118, a root path cost field 120, a bridge identifier (BRIDGE ID) field 122, a port identifier (PORT ID) field 124, a message age (MSG AGE) field 126, a maximum age (MAX AGE) field 128, a hello time field 130, and a forward delay (FWD DELAY) field 132, among others. The root identifier field 118 typically contains the identifier of the bridge assumed to be the root and the bridge identifier field 122 contains the identifier of the bridge sourcing (i.e., sending) the BPDU. The root path cost field 120 contains a value representing the cost to reach the assumed root from the port on which the BPDU is sent and the port identifier field 122 contains the port number of the port on which the BPDU is sent.

Upon start-up, each bridge initially assumes itself to the be the root and transmits BPDU messages accordingly. Upon receipt of a BPDU message from a neighboring device, its contents are examined and compared with similar information (e.g., assumed root and lowest root path cost) stored by the receiving bridge in non-recoverable memory. If the information from the received BPDU is "better" than the stored information, the bridge adopts the better information and uses it in the BPDUs that it sends (adding the cost associated with the receiving port to the root path cost) from its ports, other than the port on which the "better" information was received. Although BPDU messages are not forwarded by bridges, the identifier of the root is eventually propagated to and adopted by all bridges as described above, allowing them to select their root port and any designated port(s).

In order to adapt the active topology to failures, the root periodically (e.g., every hello time) transmits BPDU messages. The hello time utilized by the root is also carried in the hello time field 128 of its BPDU messages. The default hello time is 2 seconds. In response to receiving BPDUs on their root ports, bridges transmit their own BPDUs from their designated ports, if any. Thus, every two seconds BPDUs are propagated throughout the bridged network, confirming the active topology. As shown in FIG. 1, BPDU messages stored by the bridges also include a message age field 124 which corresponds to the time since the root instigated this generation of BPDU information. That is, BPDU messages from the root have their message age field 124 set to "0". Thus, every hello time, BPDU messages with a message age of "0" are propagated to and stored by the bridges.

After storing these BPDU messages, bridges proceed to increment the message age value. When the next BPDU message is received, the bridge examines the contents of the message age field 124 to determine whether it is smaller than the message age of its stored BPDU message. Assuming the received BPDU message originated from the root and thus has a message age of "0", the received BPDU message is considered to be "better" than the stored BPDU information (whose message age has presumably been incremented to "2" seconds) and, in response, the bridge proceeds to re-calculate the root, root path cost and root port based upon the received BPDU information. The bridge also stores this received BPDU message and proceeds to increment its message age field 124. If the message age of a stored BPDU message reaches a maximum age value, the corresponding BPDU information is considered to be stale and is discarded by the bridge.

Normally, each bridge replaces its stored BPDU information every hello time, thereby preventing it from being discarded and maintaining the current active topology. If a bridge stops receiving BPDU messages on a given port (indicating a possible link or device failure), it will continue to increment the respective message age value until it reaches the maximum age threshold. The bridge will then discard the stored BPDU information and proceed to re-calculate the root, root path cost and root port by transmitting BPDU messages utilizing the next best information it has. The maximum age value used within the bridged network is typically set by the root, which enters the appropriate value in the maximum age field 126 of its transmitted BPDU messages 100. Neighboring bridges similarly load this value in their BPDU messages, thereby propagating the selected value throughout the network. The default maximum age value under the IEEE standard is twenty seconds.

As BPDU information is up-dated and/or timed-out and the active topology is recalculated, ports may transition from the blocking state to the forwarding state and vice versa. That is, as a result of new BPDU information, a previously blocked port may learn that it should be in the forwarding state (e.g., it is now the root port or a designated port). Rather than transition directly from the blocking state to the forwarding state, ports transition through at least two intermediate states: a listening state and a learning state. In the listening state, a port waits for information indicating that it should return to the blocking state. If, by the end of a preset time, no such information is received, the port transitions to the learning state. In the learning state, a port still blocks the receiving and forwarding of frames, but received frames are examined and the corresponding location information is stored in the filtering database, as described above. At the end of a second preset time, the port transitions from the learning state to the forwarding state, thereby allowing frames to be forwarded to and from the port. The time spent in each of the listening and the learning states is referred to as the forwarding delay and is entered by the root in field 126.

As ports transition between the blocked and forwarding states, entities may appear to move from one port to another. To prevent bridges from distributing messages based upon incorrect address information, bridges quickly age-out and discard the "old" information in their filtering databases. More specifically, upon detection of a change in the active topology, a bridge begins transmitting Topology Change Notification Protocol Data Unit (TCN-PDU) messages on its root port. The format of the TCN-PDU message is well known (see IEEE 802.1D standard) and, thus, will not be described herein. A bridge receiving a TCN-PDU message sends a TCN-PDU of its own from its root port and sets the TCA flag 112 in BPDUs that it sends on the port from which the TCN-PDU was received, thereby acknowledging receipt of the TCN-PDU. By having each bridge send TCN-PDUs from its root port, the TCN-PDU is effectively propagated hop-by-hop from the original bridge up to the root. The root confirms receipt of the TCN-PDU by setting the TC flag 114 in the BPDUs that it subsequently transmits for a period of time. Other bridges, receiving these BPDUs, note that the TC flag 114 has been set, thereby alerting them to the change in the active topology. In response, bridges significantly reduce the aging time associated with their filtering databases which, as described above, contain destination information corresponding to the entities within the network. Specifically, bridges replace the default aging time of five minutes with the forwarding delay time, which by default is fifteen seconds. Information contained in the filtering databases is thus quickly discarded.

Virtual Local Area Networks

A computer network may also be segmented into a series of logical networks. U.S. Pat. No. 5,394,402, issued Feb. 28, 1995 to Ross (the "'402 Patent"), for example, discloses an arrangement for associating any port of a switch with any particular network segment. Specifically, according to the '402 Patent, any number of physical ports of a particular switch may be associated with any number of groups within the switch by using a virtual local area network (VLAN) arrangement that virtually associates the port with a particular VLAN designation. More specifically, the '402 Patent discloses a switch or hub that associates VLAN designations with its ports and further associates those VLAN designations with messages transmitted from any of the ports to which the VLAN designation has been assigned.

The VLAN designation for each port is stored in a memory portion of the switch such that every time a message is received on a given access port the VLAN designation for that port is associated with the message. Association is accomplished by a flow processing element which looks up the VLAN designation in the memory portion based on the particular access port at which the message was received. In many cases, it may be desirable to interconnect a plurality of these switches in order to extend the VLAN associations of ports in the network. The '402 Patent, in fact, states that an objective of its VLAN arrangement is to allow all ports and entities of the network having the same VLAN designation to exchange messages by associating a VLAN designation with each message. Thus, those entities having the same VLAN designation function as if they are all part of the same LAN. Message exchanges between parts of the network having different VLAN designations are specifically prevented in order to preserve the boundaries of each VLAN segment or domain. For convenience, each VLAN designation is often associated with a different color, such as red, blue, green, etc.

In addition to the '402 Patent, the Institute of Electrical and Electronics Engineers (IEEE) has promulgated the 802.1Q standard for Virtual Bridged Local Area Networks. The 802.1Q standard, among other things, defines a specific VLAN-tagged message format for use in VLAN-aware networks.

Having defined a segregated computer network, several "solutions" have been proposed for overlaying spanning trees on these virtually segregated network groups. The IEEE 802.1Q standards committee, for example, has proposed defining a single spanning tree for all VLAN designations in the computer network. That is, the switches exchange conventional BPDUs in the accustomed manner so as to define a single forwarding topology irrespective of the various VLAN designations that have been defined for the network. Thus, either all VLAN tagged frames may be forwarded and received through a given port or no tagged frames may be forwarded or received through the port. Since bridges and switches are typically pre-configured to exchange and process conventional BPDUs, this is a simple solution to implement. It also conserves processing resources by limiting the computations that must be performed to determine the bridged network's active topology.

Nonetheless, the IEEE solution has several drawbacks. For example, by defining a single spanning tree for a network having numerous VLAN designations, the IEEE solution does not allow for load balancing. That is, all data communication within the network follows the single forwarding topology defined by the one spanning tree. This may significantly degrade performance over certain, heavily utilized, portions of the network, limiting message throughput.

An alternative to the 802.1Q single spanning tree approach is to define a separate spanning tree for each VLAN designation within the network. This alternative is currently being implemented within networking equipment from Cisco Systems, Inc. of San Jose, Calif. See Cisco IOS VLAN Services document. With this approach, BPDUs are tagged with each of the VLAN designations defined within the network and exchanged among the switches. That is, as shown in FIG. 1, the BPDU header 102 is modified by adding a VLAN identifier field 134. Upon receipt, these tagged BPDUs are then processed by the switches so as to define a separate active topology or spanning tree for each VLAN designation within the bridged network. Thus, for a given port, messages associated with one VLAN designation may be forwarded and received while messages associated with a second VLAN designation may be blocked.

By defining a separate forwarding topology for each VLAN designation which spans all entities associated with that designation, this solution supports load balancing throughout the network. It also avoids possible lost connectivity problems with portions of the network that may occur with the IEEE solution. There are, nonetheless, other drawbacks. First, this approach may not scale well to large networks. That is, as the number of VLAN designations increases, the number of tagged BPDUs being exchanged correspondingly increases. Accordingly, more communications bandwidth is consumed with BPDU traffic. Each BPDU, moreover, must be processed by the switches so as to calculate the corresponding spanning trees. Depending on the number of VLAN designations within the network, this may severely tax the processing and memory resources of the switches, degrading network efficiency.

SUMMARY OF THE INVENTION

Briefly, the invention relates to a multiple instance spanning tree protocol (MI-STP) for creating a plurality of active topologies (i.e., loop-free paths) within a bridged computer network. These active topologies are established through the exchange and processing of novel multiple instance spanning tree bridge protocol data unit messages (MI-STP BPDUs) by the intermediate network devices within the network. Each MI-STP BPDU contains, among other things, information identifying the particular instance to which it relates. The active topologies moreover, are created independently of any virtual local area network (VLAN) designations defined for the network. Once the active topologies have been defined, each VLAN designation is then mapped toga single active is topology, although multiple VLAN designations are preferably mapped to the same active topology to provide load balancing. In a preferred embodiment, at least some of the MI-STP BPDU messages, in addition to specifying a particular STP instance, also contain a list of the VLAN designations that are mapped to that instance.

BRIEF DESCRIPTION OF THE DRAWINGS

The invention description below refers to the accompanying drawings, of which:

FIGS. 5 and 6 are schematic illustrations of preferred memory structures in accordance with the present invention;

DETAILED DESCRIPTION OF AN ILLUSTRATIVE EMBODIMENT

Figure 2:
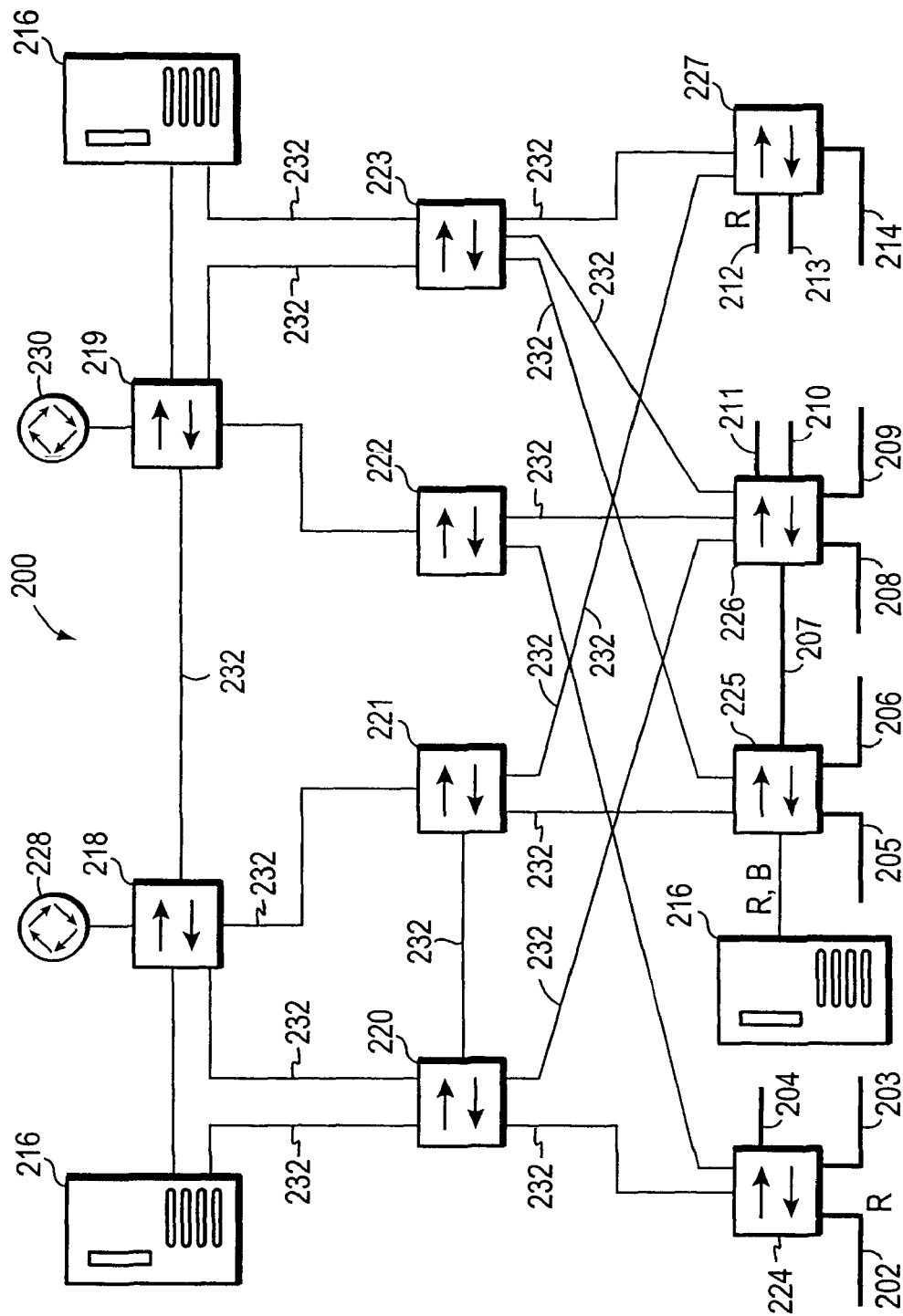
FIG. 2 is a highly schematic representation of a computer network.

FIG. 2 illustrates a partially meshed computer network 200 in accordance with the present invention. The network 200 preferably comprises a plurality of local area networks (LANs) 202-214 and servers 216, such as file servers, print servers, etc., interconnected by a plurality of intermediate devices, such as switches 218-227. One or more entities or hosts (not shown) are preferably coupled to each LAN 202-214 so that the entities may source or sink data frames to one another or to the servers 216 over the network 200. Each switch 218-227, moreover, preferably includes a plurality of ports such that each LAN 202-214 and server 216 is coupled to at least one port of switches 218-227.

The network 200 may further include one or more routers 228, 230. Switches 218-227 and routers 228, 230 are preferably interconnected by a series of links 232, such as point-to-point links. Links 232 carry messages, such as data frames, between switches 218-227 and routers 228, 230. Each switch 218-227 and router 228, 230, moreover, preferably identifies its own ports, e.g., by port numbers one, two, three, etc. Switches 218-227 and routers 228, 230 are thus able to associate specific ports with the LANs, switches, routers, servers, etc. coupled thereto.

It should be understood that the network 200 of FIG. 2 is meant for illustrative purposes only and that the present invention will operate with other networks having possibly far more complex topologies.

As set forth in the '402 Patent and/or the IEEE 802.1Q standard, selected LANs, servers and other entities may be segmented within one or more virtual local area networks (VLANs). For convenience, each VLAN designation may be identified by a color code, e.g., "R" for red, "B" for blue, "G" for green, "O" for orange, "Y" for yellow, "V" for violet, "P" for purple, "M" for magenta, etc. Each switch 218-227, moreover, associates each port coupled to a LAN or server with at least one VLAN designation (e.g., a color tag). For example, switches 224 and 227 may each associate their ports coupled to LANs 202 and 212, respectively, with the "red" VLAN designation, thereby virtually grouping these two LANs together. Since all entities located on a given LAN (e.g., LAN 202) utilize the same shared port of the corresponding switch (e.g., switch 224), each of these entities may also be considered to be associated with the VLAN designation(s) assigned to that port (e.g., red). Switch 225 may similarly associate its port coupled to server 216 with the red and blue VLAN designations, thereby allowing entities associated with either the red or blue VLAN designations to communicate with this server 216.

Those ports of switches 218-227 and routers 228, 230 coupled to links 232 are similarly associated with one or more VLAN designation(s). The VLAN designations associated with these ports preferably correspond to the VLANs that are reachable through that port. For example, switch 223 may associate its port coupled to switch 227 via link 232 with at least the red VLAN designation to provide connectivity to LAN 212 which is associated with the red VLAN designation.

To identify the various VLAN designations defined throughout the network 200, switches 218-227 and routers 228, 230 preferably participate in some type of VLAN configuration protocol, such as the VLAN Trunk Protocol (VTP) from Cisco Systems, Inc. or the GARP VLAN Registration Protocol (GVRP), that informs each switch and router of the current state of VLAN designations in use throughout the network 200. The VTP protocol is described in *White Paper: VLAN Trunk Protocol* from Cisco Systems, Inc. (Jun. 26, 2000), which is hereby incorporated by reference in its entirety. In accordance with these protocols, each switch 218-227 and router 228, 230 transmits predefined advertisements containing information regarding the current VLAN configuration at the sourcing device. By listening for the advertisements, devices may learn of any reconfiguration of the network 200, including the deletion of an existing VLAN or changes to the membership of an existing VLAN. Thus, the current association of VLAN designations may be quickly propagated to all intermediate devices.

In addition, each switch 218-227 preferably maintains a list of pre-defined numeric identifiers (e.g., numbers) that are available for assignment as VLAN IDs. As each VLAN designation (e.g., color code) is established by the network administrator, a particular numeric identifier is assigned thereto from the list. The list thus represents the maximum number of VLAN designations that may be supported within the network 200. For example, the IEEE 802.1Q draft standard specifies a list from "0" to "4095" and thus allows for 4096 different VLAN IDs. The first VLAN designation that is established (e.g., red) may be assigned to number "3" and the second VLAN (e.g., blue) may be assigned number "25". The green, orange, violet and yellow VLAN designations may be assigned to numbers "50", "51", "79" and "81", and so on.

Once the VLAN designations within network 200 have been established, any entity associated with a given VLAN designation (e.g., red) may exchange messages with any other similarly designated entity, even though the two entities may be physically remote from each other and interconnected by switches that are coupled to other VLANs. Inter-VLAN traffic (e.g., communication from a "red" designated entity to a "blue" designated entity), if permitted, is preferably performed only by the routers 228, 230, which can generally implement higher level functionality that switches 218-227.

As shown, network 200 includes redundant links interconnecting switches 218-227. For example, switch 224 is connected to switch 226 along at least two different paths; first, via switch 222 alone and second, via switches 220, 218, 219 and 223. Similarly, servers 216 are each preferably coupled to the network 200 by more than one link. The existence of such redundant links prevents portions of the network 200 from becoming isolated should any constituent link fail. Such redundancy, however, also results in the creation of loops, which, as described above, are highly undesirable.

Execution of the spanning tree algorithm will prevent loops by defining a loop-free network topology (i.e., an active topology). As set forth above, however, current implementations of the spanning tree algorithm are limited to either a single loop-free topology which precludes load balancing of network traffic or a separate loop-free topology for every VLAN designation which may result in the consumption of substantial communications bandwidth and processor resources. To avoid these disadvantages and to improve the efficient distribution of messages throughout the network 200, among other reasons, at least some of the intermediate network devices (e.g., the switches, bridges, etc.) of network 200 execute a Multiple Instance Spanning Tree Protocol (MI-STP) in accordance with the present invention.

Figure 3:
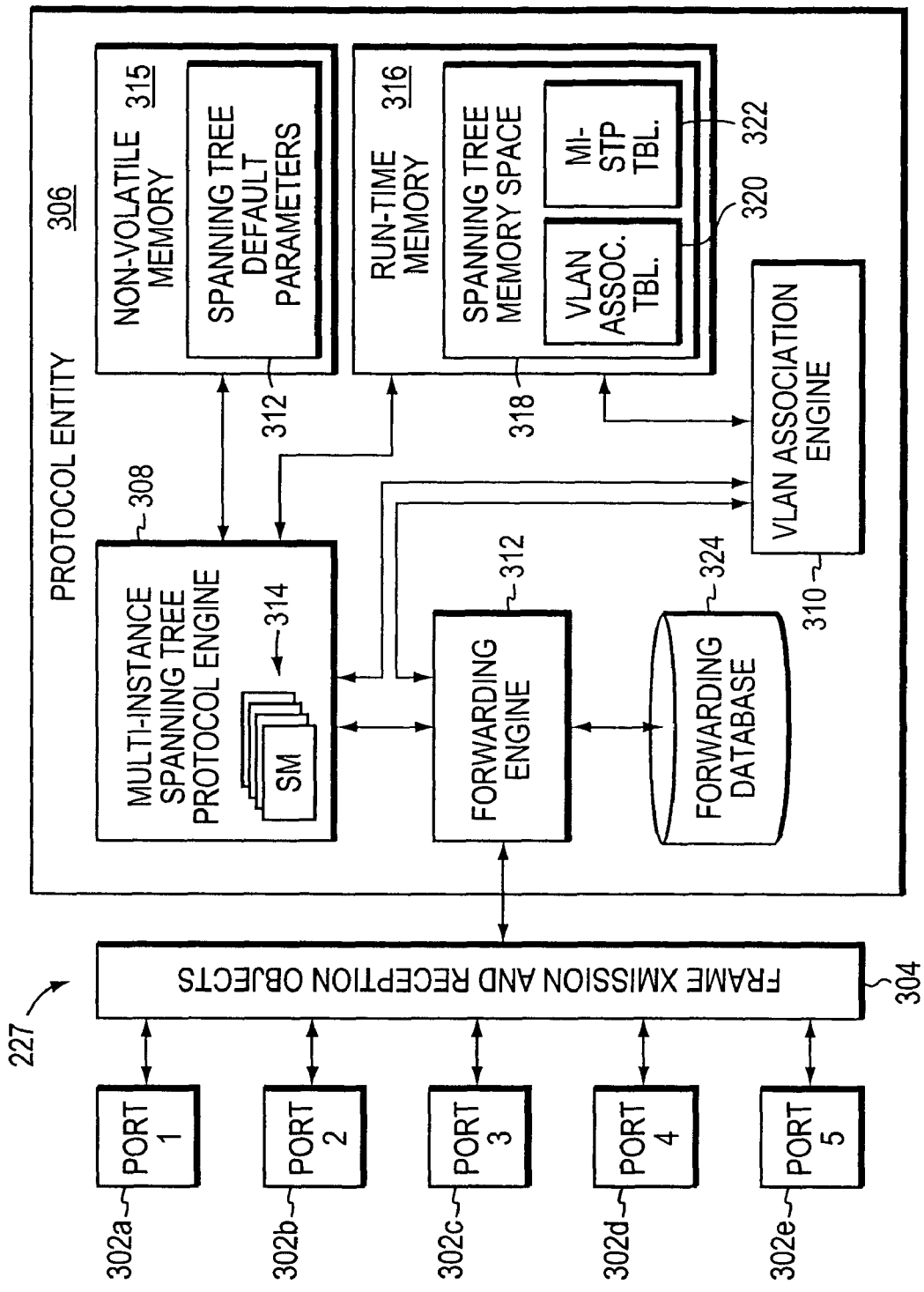
FIG. 3 is a highly schematic, partial block diagram of an intermediate network device in accordance with the present invention.

FIG. 3 is a partial block diagram of switch 227. Switch 227 includes a plurality of ports 302a-302e each of which is preferably identified by a number (e.g., port numbers 1 through 5). One or more frame transmission and reception objects, designated generally 304, are associated with the ports 302a-e such that network messages, including data frames, received at a given port 302 may be captured, and frames to be transmitted by switch 227 may be delivered to a given port 302. Frame reception and transmission objects 304 are preferably message storage structures, such as priority queues. In the illustrated embodiment, switch 227 includes transmitting and receiving circuitry, including one or more network interface cards (NICs) establishing ports for the exchange of network messages, one or more or central processing units (CPUs) and/or microprocessors and associated memory devices for performing calculations and one or more bus structures.

Switch 227 further includes at least one protocol entity 306 comprising a plurality of components. In particular, the protocol entity 306 includes at least one multiple instance spanning tree protocol (MI-STP) engine 308, at least one VLAN association engine 310 and at least one forwarding engine 312. The MI-STP engine 308 preferably includes a plurality of state machines (SMs) 314 for use in executing the MI-STP.

The MI-STP engine 308 is also in communicating relationship with a non-volatile memory (NVRAM) 315 and at least one run-time memory 316. NVRAM 315 includes a plurality of records or cells, such as array 317, for storing default spanning tree related information or parameters including an identifier for each multiple spanning tree instance within network 200 (FIG. 2), as well as more conventional spanning tree related information or parameters, such as the switch's numeric bridge identifier (ID), the assigned path cost for each port 302a-e, default hello time, maximum age time, etc. Run-time memory 316 includes a spanning tree memory space 318 that is configured to contain one or more VLAN association tables 320 and one or more MI-STP instance tables 322. As described below, VLAN association table 320 maintains the association of VLAN designations with spanning tree instances, while MI-STP table 322 maintains the current or "best" spanning tree information for each spanning tree instance.

The forwarding engine 312 is in communicating relationship with the frame transmission and reception objects 304 and is coupled to at least one forwarding database 324 that stores address information corresponding to the entities of network 200 (FIG. 2). Specifically, forwarding database 324 has a plurality of records or cells (not shown), including a destination address cell, a destination port cell and a corresponding timer cell. Each record or cell in the forwarding database 324 preferably corresponds to a particular network entity. Forwarding database 324 may also contain the association of VLAN designations to ports 302a-e.

The forwarding engine 312 is configured to switch or bridge data frames from a source port 302 to one or more destinations ports 302 depending on information contained in the forwarding database 324 and also on the spanning tree port states of the respective ports 302 as managed by MI-STP engine 308. Forwarding engine 312 also relays messages received at ports 302 relating to the MI-STP to the MI-STP engine 308 with which the forwarding engine 312 is also in communicating relationship.

It will be understood to those skilled in the art that run-time memory 316 and forwarding database 324 may be implemented as a content addressable memory (CAM) devices and that MI-STP engine 308, VLAN association engine 310 and forwarding engine 312 may each comprise registers and combinational logic configured and arranged to produce sequential logic circuits. In the illustrated embodiment, engines 308, 310 and 312 are preferably software modules or libraries containing program instructions pertaining to the methods described herein and executable by one or more processing elements of switch 227 (not shown). Other computer readable media may also be used to store and execute these program instructions. Nonetheless, those skilled in the art will recognize that other combinations of software and hardware may be utilized to implement the present invention.

Suitable intermediate network device platforms for use with the present invention include, but are not limited to, the commercially available Catalyst 5000 and 6000 series of switches from Cisco Systems, Inc. of San Jose, Calif.

Figure 4A:
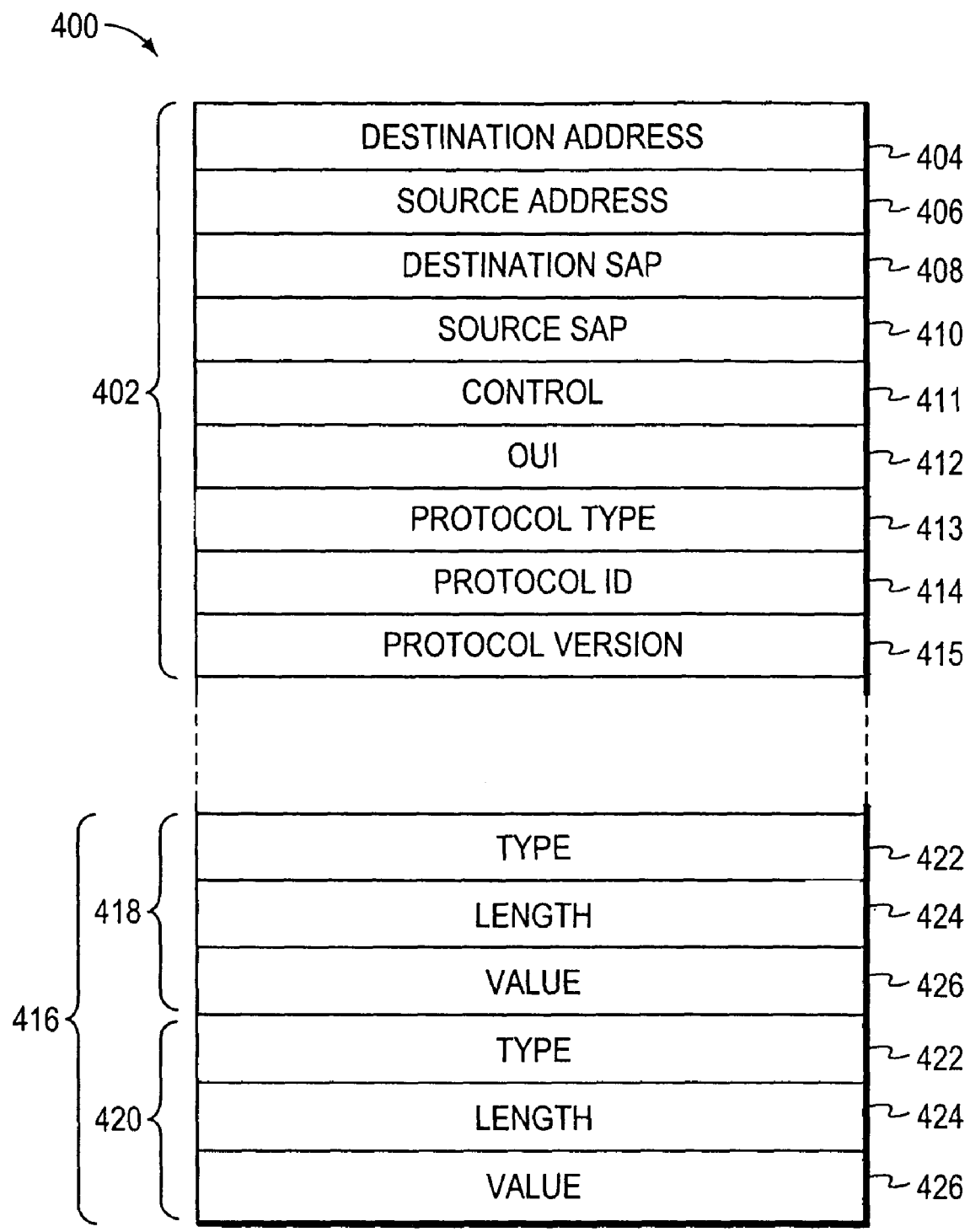
FIGS. 4A-D are a block diagram of a preferred multiple instance spanning tree bridge protocol data unit message in accordance with the present invention.

FIG. 4A is a block diagram of a preferred multiple instance spanning tree protocol bridge protocol data unit message (MI-STP BPDU) 400. The MI-STP BPDU 400 includes a header 402 that preferably complies with the Media Access Control (MAC) standard. Header 402 includes a destination address (DA) field 404, a source address (DA) field 406, a destination SAP (DSAP) field 408, a source SAP (SSAP) field 410, a control field 411, an organization unique identifier (OUI) field 412, a protocol type field 413, a protocol identifier (ID) field 414 and a protocol version field 415. Those skilled in the art will recognize that header 402 may include additional fields, such as a length field, padding field, etc. Appended to header 402 is a message area 416. In the preferred embodiment, the message area 416 is configured in type length value (TLV) format. That is, message area 416 has one or more message units 418, 420 each of which has a type field 422 that is encoded with a value specifying what type of message unit it is, a length field 424 specifying the length of the respective message unit, and a value field 426 that contains the particular information of the message unit.

Figure 4B:
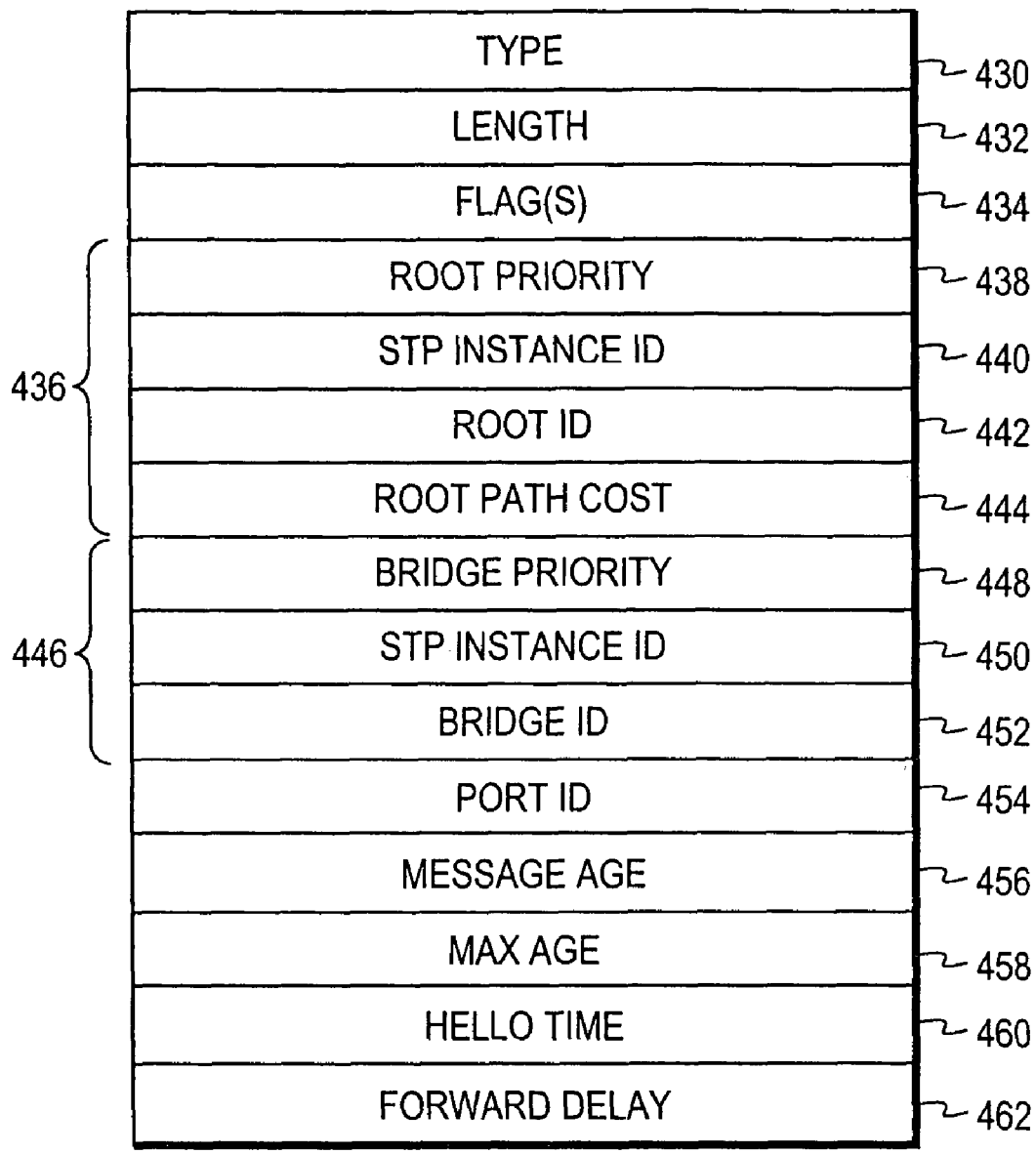

FIG. 4B is a block diagram of a configuration TLV message unit 428. Configuration TLV 428 may be appended to header 402 in order to form an MI-STP BPDU 400. The configuration TLV 428 has a plurality of fields, including a type field 430 which may be encoded with a first value, e.g., "0", selected to indicate that this message unit is a configuration TLV, and a length field 432 specifying the length of the configuration TLV 428. The configuration TLV 428 also has a "value" portion that is organized into its own fields, including one or more flag fields 434, such as a Topology Change Acknowledgment (TCA) and a Topology Change (TC) flag. The value portion of TLV message unit 428 also has a root identifier (ID) segment 436 that comprises a root priority field 438, an STP instance ID field 440, a root ID field 442 and a root path cost field 444. A bridge ID segment 446 includes a bridge priority field 448, an STP instance ID field 450 and a bridge ID field 452. The configuration TLV 428 also includes a port ID field 454, a message age field 456, a max age field 458, a hello time field 460 and a forward delay field 462.

Figure 4D:
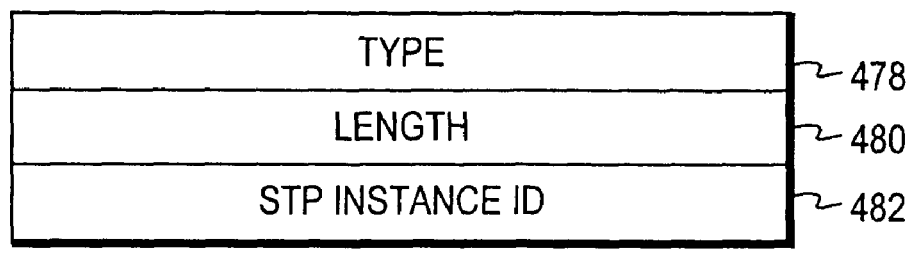
Figure 4C:
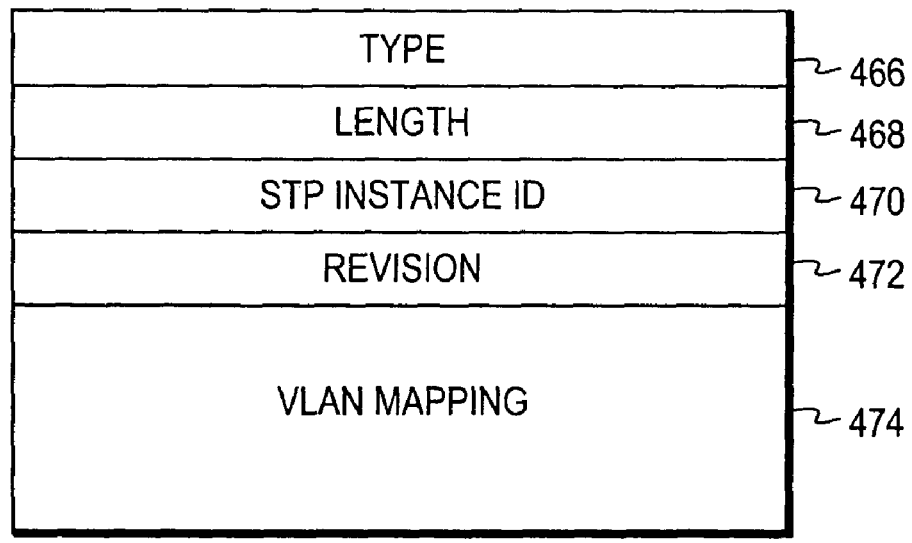

FIG. 4C is a block diagram of a VLAN mapping TLV message unit 464. The VLAN mapping TLV 464 has a type field 466 that may be encoded with another value, e.g., "2", to indicate it is a VLAN mapping TLV, and a length field 468 specifying the length of TLV 464. The value portion of VLAN mapping TLV 464 may include an STP instance ID field 470, a revision field 472 and a VLAN mapping field 474.

FIG. 4D is a block diagram of a Topology Change Notification (TCN) TLV message unit 476. TCN TLV 476 has a type field 478 that may be encoded with another value, e.g., "1", to indicate it is a TCN TLV, and a length field 480 specifying the length of TLV 476. As a value, the TCN TLV 476 has an STP instance ID field 482.

Creation of Multiple Spanning Tree Instances within the Bridged Network

Figure 8:
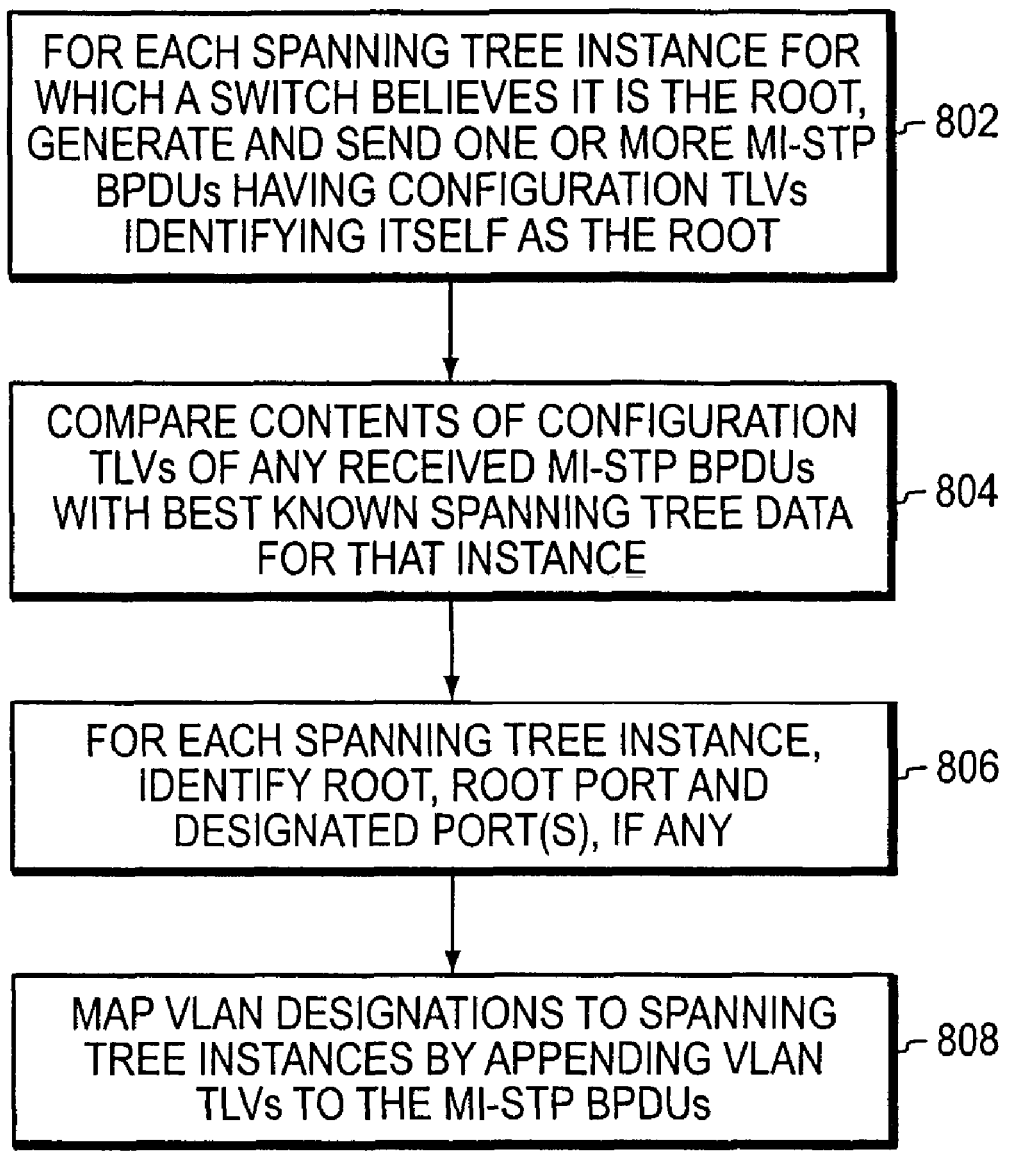
FIG. 8 is a flow diagram of the method of the present invention.

FIG. 8 is a flow diagram of the method of the present invention. Upon start-up of switch 227, the MI-STP engine 302 preferably accesses NVRAM 315 to determine how many STP instances have been defined and their identity. NVRAM 315 may be preconfigured with this information by a network administrator working either locally or remotely to switch 227. Alternatively, switch 227 may obtain this information from some MI-STP source device within network 200. This source may transmit advertisement messages to the switches 218-227 in order to distribute the MI-STP instance information. In the preferred embodiment, switches 218-227 support up to 16 spanning tree instances, and each instance is assigned or otherwise has a unique 12-bit identifier. After retrieving the MI-STP instance identifiers, engine 308 preferably establishes a separate state machine 314 for each instance. Each state machine 314, which corresponds to a particular MI-STP instance, preferably maintains a spanning tree port state for each non-disabled port 302a-e of switch 227. Initially, the state machines 314 transition each port 302a-e to a stable (i.e., non-transitory), non-forwarding state, such as the blocking spanning tree port state.

For each MI-STP instance identified in its NVRAM 315, the MI-STP engine 308 generates (e.g., "builds") an MI-STP BPDU 400 having a header 402 and a configuration TLV 428, as indicated at block 802 (FIG. 8). The fields of the configuration TLV 428 are loaded based on the assumption that switch 227 is the root for the respective MI-STP instance. These MI-STP BPDUs 400 are then forwarded from each port 302a-e of switch 227 that is not disabled. More specifically, within the DA field 404 of the header 402 of these MI-STP BPDUs 400, the MI-STP engine 308 enters a multicast address that will cause other switches within network 200 to capture and process the MI-STP BPDU 400. The MI-STP engine 308 should use the multicast bridge address specified by the IEEE 802.1D standard for use with conventional configuration BPDU messages. In the SA field 406, the MI-STP engine 308 preferably loads the MAC address for switch 227. In the DSAP and SSAP fields 408, 410, the MI-STP engine 308 preferably loads values that differ from the DSAP and SSAP values utilized in conventional configuration BPDUs. For example, rather than using the conventional hexadecimal values of "42" for both DSAP and SSAP, the MI-STP engine 308 may load both the DSAP and SSAP fields 408, 410 with the hexadecimal value "AA". As explained below, by utilizing DSAP and SSAP values that differ from those specified in the IEEE 802.1D standard for conventional configuration BPDUs, the present invention achieves desired interoperability characteristics between MI-STP compliant switches 218-227 and conventional or "legacy" intermediate devices. Engine 308 loads the control field 411 with the value "03", OUI field 412 in a conventional manner, and protocol type field 413 with a designator associated with MI-STP, e.g., "0116". In the protocol ID and protocol version fields 414, 415, the MI-STP engine 308 may load the hexadecimal values "00-00" and "00" respectively.

Within the configuration TLV 428 (FIG. 4B) portion of the MI-STP BPDU 400, the MI-STP engine 308 loads the type field 430 with the encoded value assigned to configuration TLVs (i.e., "0"). In the length field 432, the engine 308 specifies the length, preferably in octets, of configuration TLV 428. The flag(s) field 434 is preferably deasserted or set to null. In the root priority field 438, the MI-STP engine 308 loads the settable priority component of the numeric identifier for the switch assumed to be the root for this MI-STP instance. In this case, engine 308 assumes that it (i.e., switch 227) is the root and therefore loads its own identifier in field 438. In the STP instance ID field 440, the MI-STP engine 308 loads the identifier for the MI-STP instance for which this MI-STP BPDU 400 is being generated. In the preferred embodiment, the MI-STP instance ID is located or specified within the bit range of the locally assigned system ID extension of the switch's priority value. This bit range, which is defined in the IEEE P802.1t draft supplement to the 802.1D standard, is well known to those skilled in the art to which the invention pertains. In the root ID field 442, engine 308 loads the non-settable component of the numeric identifier assigned to the switch assumed to be the root for this MI-STP instance. Here, switch 227 assumes that it is the root and loads its own bridge identifier in field 442. In the root path cost field 444, engine 308 loads the cost for reaching the assumed root from the port through which the MI-STP BPDU message will be sent (in this case zero as switch 227 assumes that it is the root).

In the bridge priority field 448, the engine 308 enters the settable priority component of the switch's numeric identifier (i.e., the settable component for switch 227) which will be sending the MI-STP BPDU 400. In the STP instance ID field 450, engine 308 loads the identifier for the MI-STP instance for which this MI-STP BPDU 400 is being generated. As described above in connection with field 440, the MI-STP instance ID is located or specified within the bit range of the locally assigned IEEE 802.1t system ID extension. The STP instance ID of field 450 is thus the same as field 440 and may be used by receiving devices as a check. In the bridge ID field 442, engine 308 loads the non-settable component of the numeric identifier assigned to switch 227 (i.e., the switch sourcing MI-STP BPDU 400). In the port ID field 454, engine 308 loads the identifier associated with the port, e.g., port 302d, from which the MI-STP BPDU 400 will be sourced. Fields 456-462, which contain conventional spanning tree parameters, are loaded with corresponding values from NVRAM 315. The MI-STP engine 308 also enters the assumed spanning tree data from the configuration TLV into the MI-STP table 322 of its run-time memory 316.

FIG. 5 is a highly schematic representation of MI-STP table 322, which is arranged as an array having a plurality of rows 502 and columns 504-508 that define a plurality of records or cells. Each row 502, moreover, is associated with a spanning tree instance. In particular, the records constituting first column 504 contain the spanning tree instance identifier (e.g., 1-16). The records constituting second column 506 contain spanning tree information associated with the respective spanning tree instance, such as root, root port, root path cost, etc. The records constituting third column 508 contain the VLANs mapped to the respective spanning tree instance. Preferably, third column 508 has a first sub-column 508a containing a revision number and a second sub-column 508b containing a list of mapped VLANs. The list of mapped VLANs of second sub-column 508b may be a linked list of pointers to the corresponding VLAN designation identifiers. The MI-STP engine 308 preferably loads the spanning tree information column 506 of table 322 with the data from the configuration TLV 428 (e.g., root, root port, root path cost, etc.).

The MI-STP BPDU 400 with configuration TLV 428 generated by switch 227 is then forwarded from the port specified in field 454 (i.e., port 302d). That is, engine 308 hands the MI-STP BPDU 400 to the forwarding engine 312, which, in turn, passes it to the frame transmission and reception objects 304 for queuing and ultimate transmission on port 302d. The MI-STP engine 308 similarly generates other MI-STP BPDUs 400 for this instance and sends them from the remaining ports of switch 227 (i.e., ports 302a-c and 302e). Engine 308 also generates MI-STP BPDUs 400 for the other instances specified in NVRAM 315, enters the assumed parameters in the spanning tree information column 506 of table 322 and forwards the MI-STP BPDUs 400 from ports 302a-e. These MI-STP BPDUs 400 with configuration TLVs 428 are received by the other network devices within network 200. In particular, they are received by switches 221 and 223, which are directly coupled to switch 227 (i.e., they are one hop away). The MI-STP BPDUs 400 are captured by switches 221, 223 and passed to their MI-STP engines as a result of the multicast address within the DA field 404 and the contents of DSAP field 408.

The MI-STP engines at switches 221, 223 process the MI-STP BPDUs 400 from switch 227. In particular, the MI-STP engines at switches 221, 223 look up the MI-STP instance from field 440 and check whether they have an entry in their MI-STP tables for this instance. If so, the MI-STP engines determine whether the received MI-STP BPDU 400 from switch 227 contains "better" information than the information stored in their MI-STP tables for this instance. For example, the MI-STP engines check to see if the root ID they have stored for this MI-STP instance is higher than the root ID specified in field 442 of the received MI-STP BPDU 400. If so, the MI-STP engine at switches 221, 223 adopt this better information from switch 227. If, however, the information stored at the MI-STP table at switch 221 and/or 223 specifies a better root for this instance, then the MI-STP engine at switch 221 and/or 223 generates its own MI-STP BPDU 400 containing the better root. ID and root path cost in fields 442 and 444 and sends this MI-STP BPDU 400 to switch 227. In other words, the MI-STP engines at switches 221-227 preferably evaluate the spanning tree parameters from received MI-STP BPDUs 400 and respond in accordance with the rules specified in the well-known IEEE 802.1D standard.

Suppose, for example, that switch 227 receives MI-STP BPDUs 400 from both switch 221 and 223 in response to the MI-STP BPDU 400 that it sent for a given MI-STP instance. These MI-STP BPDUs 400 are captured at the ports 302 of switch 227 and passed to the MI-STP engine 308, which examines them, as indicated at block 804. Presumably, these received MI-STP BPDUs 400 contain better information than that currently known by the MI-STP engine 308 of switch 227, and thus better than the information contained in the MI-STP BPDU 400 that switch 227 sent. Accordingly, engine 308 stores this new information (e.g., new root, new root path cost) in the spanning tree information column 506 of its MI-STP table 322, replacing the prior information for this MI-STP instance. Engine 308 also uses the information from the MI-STP BPDUs 400 from switches 221 and 223 to identify its root port for this instance and any designated ports, as indicated at block 806. The state machine 314 associated with this instance then transitions these ports (i.e., the root port and any designated ports) to the forwarding state. Since there are no switches or other intermediate devices coupled to LANs 212-214, switch 227 does not receive any MI-STP BPDUs 400 on these ports 302, and these ports become designated ports for each spanning tree instance.

The steps of generating and sending MI-STP BPDUs 400 with configuration TLVs 428 and processing the contents of any received MI-STP BPDUs 400 is repeated by the other switches 218-226 of the bridged network 200. As a result, for each spanning tree instance, each switch 218-227 will elect a single root within the network 200, identify its one root port (i.e., the port providing the lowest cost path to elected root) and identify any designated ports. Thus, for each spanning tree instance, switches 218-227 define a loop-free active topology within the bridged network 200. Importantly, switches 218-227 have defined not one, but multiple loop-free topologies within the network 200, and the definition of these loop-free topologies is made independently of the VLAN designations with network 200. Each loop-free topology, moreover, is capable of carrying data and other traffic across the network. Once the loop-free topologies have been defined, the VLAN designations can be mapped to the spanning tree instances.

Mapping of VLAN Designations to Active Topology Instances

The mapping of VLAN designations to loop-free topologies is preferably initiated by the roots. More specifically, each root of a spanning tree instance controls the mapping of VLAN designations to that spanning tree instance. Suppose, for example, that switch 221 determines that it is the root for spanning tree instance "12". When switch 221 determines that the loop-free topology for spanning tree instance "12" has converged, it preferably accesses its NVRAM and retrieves the mapping of VLAN designations to spanning tree instance "12". The NVRAM at switch 221 may be pre-configured with this information by the network administrator or switch 221 may obtain this information through execution of some information distribution protocol. In the preferred embodiment, all switches 218-227 learn of the mappings of VLAN designations to spanning tree instances through execution of the VLAN Trunk Protocol (VTP) from Cisco Systems, Inc. In particular, the VLAN to spanning tree instance mappings are distributed among switches 218-227 within VTP messages. Switches 218-227 are preferably configured as either VTP clients or VTP servers to ensure that the VLAN mapping information is received by them.

Upon obtaining the VLAN mappings for the spanning tree instance for which it is the root, switch 221 generates an MI-STP BPDU 400 that carries a VLAN mapping TLV 464 (FIG. 4C), as indicated at block 808. First, the MI-STP engine of switch 221 generates an MI-STP BPDU header 402 as described above. The MI-STP engine then appends a VLAN mapping TLV 464. In the type field 466, the MI-STP engine loads the encoded value assigned to VLAN mapping TLVs (i.e., "2"). In the length field 468, the engine specifies the length, preferably in octets, of VLAN mapping TLV 464. In the STP instance ID field 470, the engine enters the identifier for the spanning tree instance to which the VLAN mapping TLV 464 pertains. In the revision field 472, the engine loads a predetermined value, such as a number (e.g., "1"), that is used to determine whether the contents of the VLAN mapping field 474 have been changed since a prior VLAN mapping TLV 464. In the VLAN mapping field 474, the MI-STP engine enters the VLANs that are mapped to the spanning tree instance specified in field 470. For example, the MI-STP engine may load VLAN mapping field 474 with a list of the numeric identifiers of the VLANs mapped to this spanning tree instance.

The MI-STP BPDU 400 with the VLAN mapping TLV 464 is then sent by root switch 221 from all of its ports that are in the forwarding state for the spanning tree instance specified in field 470. The MI-STP BPDU 400 with the VLAN mapping TLV 464 may thus be received by the neighboring switches (i.e., switches 218, 220, 225 and 227). Upon receiving the MI-STP BPDU 400 with the VLAN mapping TLV 464, it is forwarded to the respective MI-STP engine at each switch 218, 220, 225 and 227 for processing. The MI-STP engines parse the received MI-STP BPDU 400 and use the information from the VLAN mapping TLV 464 to update the data in their VLAN association tables, such as table 320 at switch 227.

FIG. 6 is a highly schematic representation of a VLAN association table 320, which is arranged as an array having a plurality of rows 602 and columns 604-606 that define a plurality of records or cells. Each row 602, moreover, is associated with a particular VLAN. In particular, the records constituting first column 604 contain all of the possible VLAN designations (e.g., 0-4095) for the bridged network 200. The records constituting second column 606 contain the spanning tree instance(s) mapped to the corresponding VLAN designation of the respective row 602. Preferably, the records of column 606 contain pointers to the identifier(s) of the spanning tree instance to which the respective VLAN designation has been mapped.

For example, suppose switch 227 receives an MI-STP BPDU 400 in which the STP instance ID field 470 contains spanning tree instance "12" and that the VLAN mapping field 474 lists VLAN designations "2", "3", "5" and "4094". In response, the MI-STP engine 308 cooperates with VLAN association engine 310 to modify VLAN association table 320 by adding a pointer to spanning tree instance "12" within second column 606 for rows 602 that correspond to VLAN designations "2", "3", "5" and "4094". Upon updating VLAN association table 320, switch 227 generates its own MI-STP BPDU 400 with a VLAN mapping TLV 464 based on the received MI-STP BPDU 400. Switch 227 forwards the MI- STP BPDU 400 out all designated ports for the spanning tree instance specified in field 470 (i.e., instance "12").

This process is repeated by the other switches receiving the MI-STP BPDU 400 with the VLAN mapping TLV 404 from root switch 221. In this way the MI-STP BPDUs 400 from root switch 221 containing the VLAN mappings for spanning tree instance "12" are propagated throughout the bridged network 200. Each switch 218-227 is thus able to update its VLAN association table 320 (FIG. 5) with the spanning tree instance mapped to these VLAN designations. The root switches for the other spanning tree instances similarly generate MI-STP BPDUs 400 with VLAN mapping TLVs 464 identifying the VLAN designations mapped to their spanning tree instances, and forward these MI-STP BPDUs 400 from their ports. Accordingly, the VLAN association table 320 at each switch 218-227 is modified to contain a list of the VLAN designations mapped to each spanning tree instance defined within the bridged network 200.

Upon receiving an MI-STP BPDU 400 containing a VLAN mapping TLV 464 that maps one or more new VLANs to a given instance (including the first MI-STP BPDU 400 carrying a VLAN mapping TLV 464), the respective switch initially blocks each of the new VLANs. That is, the switch does not forward any traffic for these new VLANs. The switch also commences a VLAN mapping timer for each of the new VLANs. The VLAN mapping timer is preferably set to the forward delay value of field 464. If all subsequent MI-STP BPDUs 400 for the given instance confirm that the new VLANs are indeed mapped to this instance, then, upon expiration of the VLAN mapping timer (i.e., after a forward delay time has elapsed), the new VLANs are moved to the given instance and traffic for these new VLANs may forwarded. Switches preferably wait to forward VLAN traffic for the forward delay time, as described above, to ensure that the VLAN mapping has been propagated throughout the bridged network.

Additionally, if a switch receives an MI-STP BPDU 400 for a given instance having a VLAN mapping TLV 464 that is missing one or more VLANs that the switch had previously mapped to this instance, the switch preferably blocks those VLANs. That is, the switch preferably stops forwarding any traffic tagged with these VLANs. The switch does not forward any traffic for that VLAN. It is as if the VLAN is no longer active.

Each VLAN association engine, moreover, maintains a timer associated with the contents of its VLAN association table 320. In the preferred embodiment, this timer corresponds to the timer for the spanning tree information for the respective instance. Thus, every time a switch receives an MI-STP BPDU 400 with a configuration TLV 428 and a VLAN mapping TLV 464 that originated from the root for a given spanning tree instance, the VLAN association engine at the switch resets the timer for the corresponding spanning tree information and VLAN mappings at its VLAN association table 320. If a switch stops receiving MI-STP BPDUs 400 for a given spanning tree instance, this timer will continue to increment until the maximum age is reached. At this point, the switch considers the respective spanning tree information of column 506 of MI-STP table 322 and the VLAN mappings of column 508*b* to be stale, and discards both the spanning tree information and the VLAN mappings. The MI-STP engine may, for example, deassert or set to null the spanning tree information of column 506 and VLAN mappings of column 508*b*.

The MI-STP engine then proceeds to recalculate the spanning tree for this instance. For example, the MI-STP engine may begin generating and sending MI-STP BPDUs 400 with configuration TLVs 428 that are loaded with the next best information that is has for this spanning tree instance.

If an MI-STP BPDU 400 with a configuration TLV 428 and a VLAN mapping TLV 464 are received by the MI-STP engine 308 for an unknown spanning tree instance, the engine 308 preferably creates a new entry or row 502 in MI-STP table 322 for this instance. The VLAN association engine 310 also examines the VLAN mapping TLV 464 to see whether it presents any conflicts by, for example, including a VLAN designation that is already mapped to some other spanning tree instance. The MI-STP engine 308 also initiates a new timer for the unknown spanning tree instance, which may be set to a default maximum age of 20 seconds.

When a switch, such as switch 227, receives a message from an access port 302 (i.e., a port coupled to LANs 212-214) for forwarding on a trunk port 302 (i.e., a port coupled to another intermediate device), it preferably appends the appropriate VLAN designation to the message. The switch 227 then performs a look-up on its VLAN association table 322 to see which spanning tree instance this VLAN designation is mapped. If the VLAN designation is mapped to exactly one spanning tree instance, the switch 227 forwards the message along the active topology for that spanning tree instance. If the VLAN designation is mapped to more than one spanning tree instance, then a conflict exists and the switch does not forward any messages for this VLAN. If the VLAN designation is not mapped to any spanning tree instance, the switch similarly does not forward any traffic for this VLAN designation.

Conflicts may arise when the root switches for two different spanning tree instances each believe that a given VLAN designation should be mapped to its respective spanning tree instance. Suppose, for example, that switch 227 receives an MI-STP BPDU 400 that maps the red VLAN designation to spanning tree instance "15". The MI-STP engine 308 and VLAN association engine 310 will update its VLAN association and MI-STP tables 320, 322 accordingly. In particular, for the row 602 of VLAN association table 320 that corresponds to the numeric identifier for the red VLAN designation, the VLAN association engine 310 enters a pointer to spanning tree instance "15" in the corresponding cell of column 606. If the MI-STP engine 308 subsequently receives another MI-STP BPDU 400 that maps the red VLAN designation to spanning tree instance "6", the VLAN association engine 310 adds a pointer to spanning tree instance "6" to the row 602 that corresponds to the red VLAN designation in the VLAN association table 320. The corresponding cell of column 606 for this row now contains pointers to two spanning tree instances, i.e., "15 and "6". This condition is detected by the VLAN association engine 310, which blocks all traffic for the red VLAN designation. That is, switch 227 stops forwarding messages tagged with the red VLAN designation. These messages may either be buffered or discarded.

The roots for spanning tree instances "6" and "15" preferably resolve the conflict. Specifically, when the root for spanning tree instance "6" to which the red VLAN is mapped receives an MI-STP BPDU 400 that maps the red VLAN to spanning tree instance "15", the root issues a request message to a VTP server for the mapping of the red VLAN to a spanning tree instance. If the VTP server responds that the red VLAN is mapped to spanning tree instance "6", the root continues to send MI-STP BPDUs 400 that map the red VLAN to spanning tree instance "6". If the VTP server responds that the red VLAN is mapped to spanning tree instance "15", the root removes the VLAN from its VLAN mapping TLVs 464 and changes the number within revision field 472 of subsequently sent VLAN mapping TLVs 464.

The same process is performed by the root for spanning tree instance "15". Conflicts are thus resolved by the roots querying a VTP server for the correct mapping of VLANs to spanning tree instances. Upon resolution of the conflict, switches wait the forward delay time before forwarding traffic for the respective VLAN as described above.

As indicated above, a revision number is maintained for each spanning tree instance at column 508a (FIG. 5) of table 322. As MI-STP BPDUs 400 are received by a switch, e.g., switch 227, the VLAN association engine 310 examines the STP instance ID and revision number fields 470, 472 of the VLAN mapping TLV 464. If the revision number of field 470 matches the value stored at column 508a for the respective row 502 of table 322, the VLAN association engine 310 "knows" that no changes have been made to the VLAN mapping and preferably does not waste resources parsing the contents of the VLAN mapping field 474. If the root of a given spanning tree instance is notified of a change in the VLAN mapping for a given spanning tree instance (e.g., by a VTP server), it preferably makes the change in the VLAN mapping field 474 of subsequent VLAN mapping TLVs 464. For example, if the root learns that a new VLAN designation is to be mapped to the given spanning tree, it adds the VLAN designation to the VLAN mapping field 474. If the root learns that a previously mapped VLAN designation is no longer associated with the given spanning tree instance, it removes the previously mapped VLAN designation from the VLAN mapping field 474. In either case, the MI-STP engine 308 updates (e.g., increments or decrements) the revision number of field 474 in response to changing the contents of the VLAN mapping field 474.

When a switch, e.g., switch 227, receives this MI-STP BPDU 400 it sees that the contents of the revision field 474 do not match the value stored in column 508a for the row 502 of MI-STP table 322 corresponding to the given spanning tree instance. Accordingly, the MI-STP engine 308 updates the list of VLAN designations stored in column 508b for this row 502 to match the contents of the VLAN mapping field 474 of the received MI-STP BPDU 400. The VLAN association engine 310 also modifies the contents of the VLAN association table 320. In particular, for each VLAN identified in the VLAN mapping field 474, the VLAN association engine 310 changes the contents of column 606 of the respective row 602 to reflect the spanning tree instance identified in STP instance ID field 470.

The mapping of VLANs to pre-established spanning tree instances (i.e., active topologies) may result in a possible loss of connectivity for one or more VLANs. This may best be understood by means of an example. Suppose that port 302a at switch 227 (which leads to switch 221 and is thus a trunk port) is associated with the red and blue is VLAN designations, and that port 302b (which leads to switch 223 and is thus also a trunk port) is associated with the green and orange VLAN designations. Suppose further that, following the exchange of MI-STP BPDUs 400 with configuration TLVs 428, port 302a is blocking and port 302b is forwarding for spanning tree instance "11", and that port 302a is forwarding and port 302b is blocking for spanning tree instance "15". If LAN 212 is also associated with the red VLAN designation and the red VLAN designation is subsequently mapped to spanning tree instance "11", there will be a loss of connectivity to LAN 212.

In particular, if switch 227 receives a message from LAN 212 that is destined for an entity on LAN 202 (which is also associated with the red VLAN designation), switch 227 will append a red VLAN designation to the message. Switch 227 will then try and forward the message out one of its trunk ports 302a, 302b. The message, however, cannot be forwarded from port 302a because, although port 302a is associated with the red VLAN designation, it is in the blocking state for spanning tree instance "11" to which the red VLAN designation is mapped. Furthermore, although port 302b is in the forwarding state for spanning tree instance "11", port 302b is not associated with the red VLAN designation, and therefore the red tagged message cannot be forwarded from this port. The message from LAN 212 cannot be forwarded beyond switch 227, and thus entities disposed on LAN 212 have been cut-off from the rest of the bridged network 200.

To prevent such connectivity problems, the MI-STP engines may recalculate the spanning tree algorithm following the mapping of VLAN designations to spanning tree instances. For example, if switch 227 receives a VLAN mapping TLV 464 that maps the red VLAN designation to spanning tree instance "11", the MI-STP engine 308 considers all ports 302 of switch 227 that are not associated with the red VLAN designation to have become disabled in connection with spanning tree instance "11". This will force the MI-STP engine 308, among other things, to identify a new root port for spanning tree instance "11". Since only red VLAN designated ports are now included in the spanning tree calculations for instance "11" (the non-red VLAN designated ports being treated as disabled), only a port 302 that is associated with the red VLAN designation can become the new root port for spanning tree instance "11". In this way, switches 218-227 avoid partitioning the bridged network 200 and the consequent loss of connectivity to affected LANs or end stations. This re-calculation of active topologies following the mapping of VLAN designations to instances, however, is a less than ideal situation.

In the preferred embodiment, the root for each spanning tree instance (including assumed roots) preferably generates and sends an MI-STP BPDU 400 with both a configuration TLV 428 and a VLAN mapping TLV 464 every hello time. That is, upon determining that it is a root for a given spanning tree instance, a switch will begin appending VLAN mapping TLVs 464 to the MI-STP BPDUs 400 already carrying configuration TLVs 428 that the switch sends every hello time. In other words, the MI-STP engines are preferably configured to append VLAN mapping TLVs 464 to MI-STP BPDUs 400 along with configuration TLVs 428 from the beginning.

The VLAN mappings are again obtained by the switches 218-227 either from the network administrator or by a protocol, such as VTP. With this embodiment, the MI-STP engine 308 first checks the configuration TLV 428 of a received MI-STP BPDU 400. If the spanning tree parameters (e.g., root, root path cost, etc.) contained in a received configuration TLV 428 are inferior to the spanning tree parameters currently stored for the subject spanning tree instance, then the configuration TLV 428 of the MI-STP BPDU 400 is basically ignored. If the STP-BPDU 400 appears to be from the root (e.g., it contains "better" spanning tree information), the MI-STP engine of the receiving switch prunes those ports associated with VLAN designations not contained in the VLAN mapping TLV 464 from its calculation of the spanning tree for this instance. In other words, only ports associated with the VLAN designations contained in the VLAN mapping field 474 of the received MI-STP BPDU 400 are considered in the STP calculations for this instance.

Regardless of whether the configuration TLV 428 contains superior or inferior information, the VLAN mapping TLVs 464 of received MI-STP BPDU 400 are always parsed for additional or missing VLANs. If the VLAN mapping TLV 464 has additional or missing VLANs, the switch responds as described above.

It should be understood that, if a VLAN mapping TLV 464 is appended to an MI-STP BPDUs 400 already carrying a configuration TLV 428, the VLAN mapping TLV 464 need not include its own STP instance ID field 470. Instead, field 470 can be eliminated and the receiving MI-STP engine can determine the spanning tree instance of the MI-STP BPDU 400 by examining fields 440 and 450 of the configuration TLV 428.

It should be further understood, that an MI-STP BPDU 400 could contain configuration TLVs and VLAN mapping TLVs for not just one but multiple spanning tree instances.

When a switch, such as switch 227, detects a change in the active topology for any spanning tree instance, it preferably generates an MI-STP BPDU 400 having a TCN TLV 476 (FIG. 4D). Suppose, for example, that switch 227 receives an MI-STP BPDU 400 on a designated port having "better" spanning tree information than that stored for the respective port. The state machine 314 of the MI-STP engine 308 preferably transitions this port from the forwarding state to the blocking state for this spanning tree instance. The MI-STP engine 308 then generates an MI-STP BPDU 400 by appending a TCN TLV 476 to a header 402. In the type field 478, engine 305 loads the encoded valve assign to TCN TLVs (i.e., "1"). In the length field 480, engine 308 specifies the length of the TCN TLV 476. In the STP instance ID, engine 308 loads the identifier for the spanning tree instance for which the change in topology was detected.

Switch 227 then sends the MI-STP BPDU 400 with the TCN TLV 476 from its root port for the respective spanning tree instance. Switch 227 preferably continues to send the TCN TLV 476 until it receives an MI-STP BPDU 400 in which the TCA flag of field 434 (FIG. 4B) of configuration TLV 428 is set, thereby acknowledging receipt of the TCN TLV 476 by upstream switch. Meanwhile, the upstream switches propagate the TCN TLV 476 to the root of the respective spanning tree instance. The root then sets the TC flag of field 434 in the subsequent configuration TLVs 428 transmitted by the root.

As each switch receives the configuration TLVs 428 with the TC flag set, they shorten the age-out time associated with their forwarding databases.

Interfacing the Multiple Instance Spanning Tree Protocol with Legacy Devices

Some computer networks may include devices, such as switches, bridges, hubs, etc. which do not execute the Multiple Instance Spanning Tree Protocol of the present invention as well as those that do. For example, a network may include some switches that are configured to calculate a single spanning tree, regardless of the number of VLAN designations. The network may also include other switches that are configured to calculate a separate spanning tree for each VLAN designation. The Multiple Instance Spanning Tree Protocol (MI-STP) of the present invention is designed to cooperate with such "legacy" devices in order to prevent the formation of loops within such networks.

Figure 7:
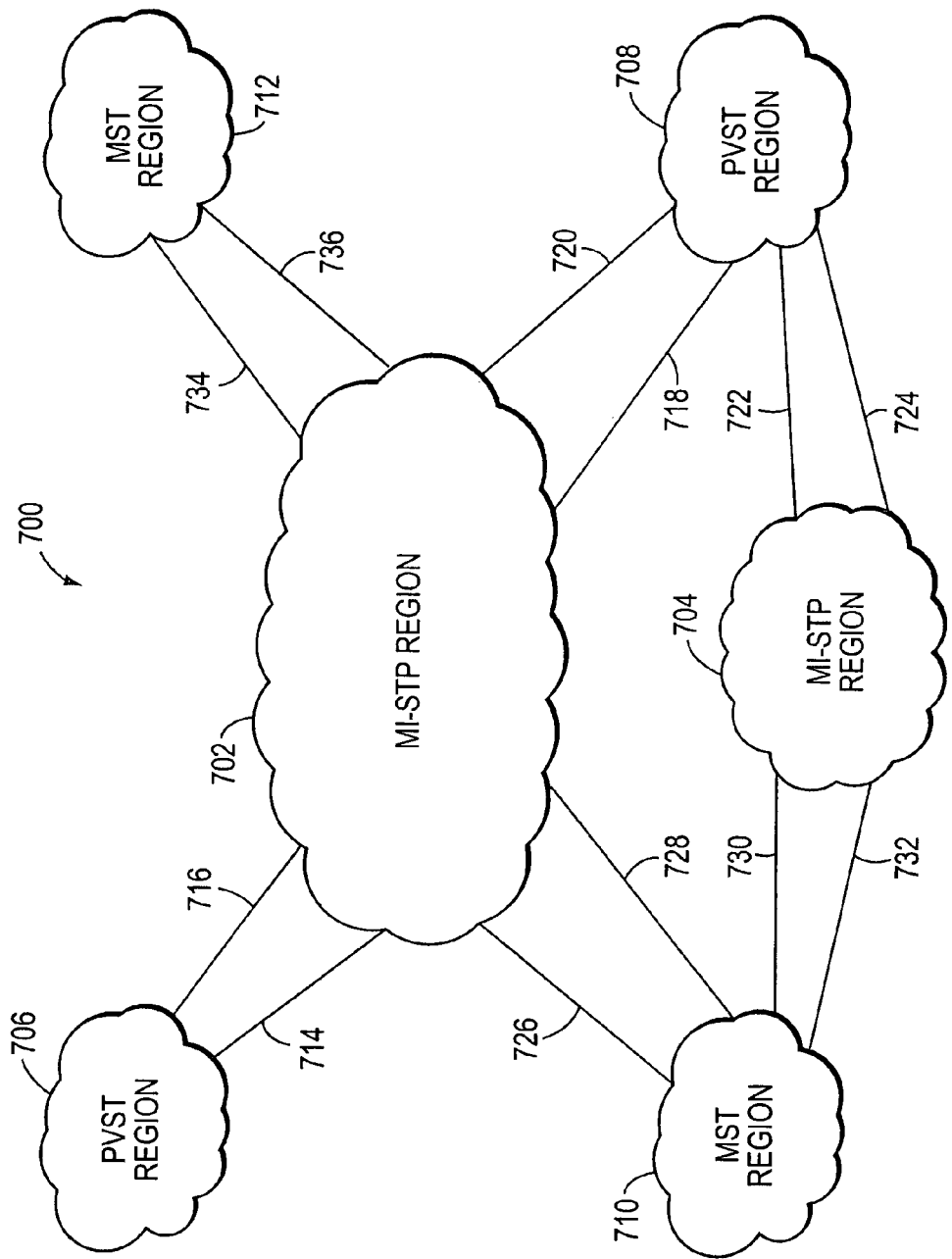
FIG. 7 is a highly schematic representation of a heterogeneous computer network in which the present invention may be operated.

FIG. 7 is a highly schematic representation of a network 700 including a plurality of regions each comprising a homogeneous set of switches or devices. More specifically, network 700 includes two MI-STP regions 702, 704 each including a plurality of switches (not shown) configured to run the MI-STP protocol, as described above. Network 700 further includes two regions 706, 708 each having a plurality of switches (not shown) configured to calculate a separate spanning tree for each VLAN designation defined within the respective regions 706, 708, i.e., per VLAN spanning tree (PVST) regions. Two other regions 710, 712 include a plurality of switches (not shown) configured to calculate a single spanning tree, regardless of the number of VLAN designations defined within the respective regions 710, 712, i.e., mono-spanning tree (MST) regions.

Each PVST region 706, 708 is preferably coupled to one or both of the MI-STP regions 702, 704 by a plurality of links 714-724. Similarly, each MST region 710, 712 is coupled to one or both of the MI-STP regions 702, 704 by a plurality of links 726-736. As shown, regions 702-712 are interconnected by multiple links 714-736 so as to prevent the isolation of any given region should any link fail. The use of multiple (i.e., redundant) links, however, may result in the existence of circuitous paths or loops at the boundaries between the various regions. In addition, one or more VLAN designations (e.g., red) may be defined in each region. Since data messages tagged with such a VLAN designation may need to travel across several regions (e.g., from PVST region 706 to MI-STP region 704 via regions 702 and 710), a loop-free topology or spanning tree along which such tagged messages can travel both inside the discrete regions and across the boundaries between regions must therefore be established.

The multiple instance spanning tree protocol (MI-STP) of the present invention ensures that at least one active topology or spanning tree is defined across the boundaries of dissimilar regions so as to permit the forwarding of messages throughout the network 700 while preventing the formation of loops.

MI-STP/MST Boundaries

Figure 1:
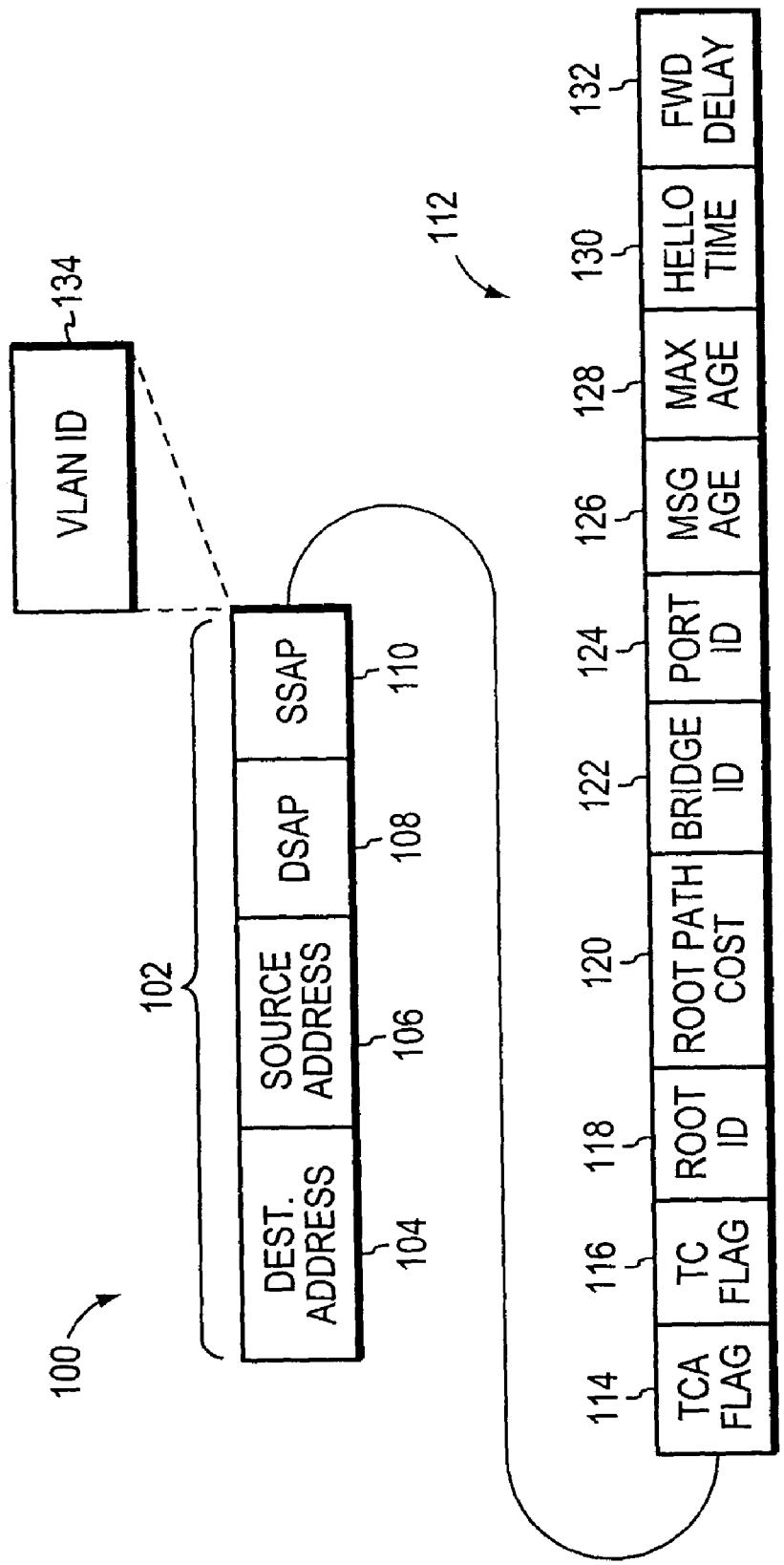
FIG. 1, previously discussed, is a block diagram of a conventional bridge protocol data unit message.

MI-STP BPDUs 400 generated within MI-STP region 702 or 704 and entering an MST region 710, 712 across links 726, 728, 734 or 736 are discarded and not processed by the switches within MST regions 710, 712. As described above, MI-STP BPDUs 400 utilize the same multicast bridge address as specified in the IEEE 802.1D and 802.1Q standards for conventional BPDUs 100 (FIG. 1) as their destination address within DA field 404 (FIG. 4A). Accordingly, MI-STP BPDUs 400 entering the MST regions 710, 712 are captured by MST devices and handed up to those devices' spanning tree protocol entities. The spanning tree protocol entities, in turn, examine the contents of the header 402 of the MI-STP BPDU 400, including DSAP and SSAP fields 408, 410. The values loaded into the DSAP and SSAP fields 408, 410 by MI-STP compliant switches, however, do not match the values specified in the IEEE 802.1D or 802.1Q standards. As a result, the spanning tree protocol entities of the border MST switches within regions 710, 712 consider the MI-STP BPDU 400 to be invalid. Accordingly, the spanning tree protocol entities at the border MST switches discard the MI-STP BPDU 400 and do not attempt to process its contents.

Conventional, un-tagged BPDUs 100 (e.g., IEEE 802.1D compliant) that are generated within MST regions 710, 712 and enter MI-STP regions 702, 704 are tunneled through those regions 702, 704 across one spanning tree instance. Specifically, when a conventional, untagged BPDU 100 is received at a border switch in an MI-STP region 702, 704, it is captured and passed to the MI-STP engine at that border switch. The MI-STP engine identifies the BPDU 100 as a conventional BPDU based on the values of its DSAP and SSAP fields 108, 110. The MI-STP engine forwards the conventional BPDU 100 from all switch ports that are in the forwarding or the learning spanning tree port states for a preselected spanning tree instance, e.g., instance "17". As described above, in the preferred embodiment, all MI-STP compliant switches establish a loop-free topology for spanning tree instance "17". However, no VLANs are mapped to instance "17". Spanning tree instance "17" thus exists solely for distributing conventional BPDUs 100.

The conventional BPDU 100, moreover, is preferably replicated and forwarded by the MI-STP devices without any modifications. To the extent an MST region, such as region 710, is coupled to an MI-STP region, such as region 702, by multiple links 726, 728, a conventional BPDU 100 received within MI-STP region 702 on a first link 726 will be returned to the MST region 710 unmodified on the second link 728. The conventional BPDU 100 received from MST region 710 will also be forwarded into MST region 712 along both links 734 and 736.

The interconnected MST regions 710, 712 will thus elect a single root for the single loop-free topology defined within each region 710, 712. This root, moreover, will reside in either MST region 710 or 712, and not within the intermediary MI-STP region 702, since the devices within MI-STP region 702 do not examine or process the conventional BPDUs 100 received from MST regions 710, 712. If the root is inside MST region 710, then MST region 710 will have only one unblocked connection leading to MI-STP region 702, i.e., either link 726 or 728 will be blocked. The non-root MST region 712 is split into as many sub-regions (i.e., two) as there are connections to the intermediary MI-STP region 702 (i.e., links 734 and 736). That is, neither link 734 nor 736 is blocked, but the two sub-regions are blocked inside the MST region 712 relative to each other. A VLAN tagged message entering an MST region 710, 712 from an MI-STP region 702, 704 is thus blocked from returning to that MI-STP region 702, 704. Because of this, the tagged message need not follow the same loop-free path within the MI-STP region 702, 704 that the conventional BPDU 100 from MST region 710, 712 followed within the MI-STP region 702, 704. In other words, tagged messages from MST region 710 or 712 can follow the loop-free path for the spanning tree instance to which the VLAN designation of the tagged messages are mapped inside the MI-STP region 702, 704.

Conventional TCN messages from the MST regions 710, 712 are also tunneled through the MI-STP region 702.

For ports in MI-STP regions that are configured in accordance with the Inter-Switch Link (ISL) protocol from Cisco Systems, Inc., the process is slightly different. The ISL protocol defines a particular encapsulation technique for messages transferred across an ISL configured link. These ISL messages must be tagged with a VLAN designation. If an un-tagged BPDU 100 from an MST region 710, 712 is to be forwarded within an MI-STP region 702, 704 on a ISL configured link, the numeric identifier for VLAN "1" is preferably used in the ISL header for such un-tagged BPDUs 100. The ISL protocol is described in U.S. patent application Ser. No. 08/623,142 filed Mar. 28, 1996, now Pat. No. 5,742,604, which is hereby incorporated by reference in its entirety.

When a conventional, untagged BPDU 100 is received by a switch in the MI-STP region 702, the switch checks the BPDU's Topology Change (TC) flag 116. If it is set (indicating a change in the MST region), the MI-STP switch sets the TC flag in the flags field 434 in the configuration TLVs 428 of MI-STP BPDUs for those spanning tree instances for which the switch is the root. If the MI-STP switch is not a root for any spanning tree instance, it does nothing in response to receiving a conventional, untagged BPDU 100 with its TC flag 116 set (other than tunneling the BPDU as described above).

If the root of a spanning tree instance in the MI-STP region 702 is notified or otherwise detects a topology change, it preferably generates and sends a conventional, untagged TCN. This TCN is similarly tunneled through the MI-STP region 702 and reaches the MST regions 710, 712. In the MST regions 710, 712, the TCN is propagated hop-by-hop to the MST root, which responds by setting the TC flag field 116 of subsequent BPDUs 100 sourced by the MST root.

MI-STP/PVST Boundaries

The interaction between PVST regions 706, 708 and MI-STP regions 702, 704 is similar to that described above for the MST/MI-STP boundaries. That is, BPDUs 100 tagged with a VLAN ID field 134 that enter an MI-STP region 702, 704 from a PVST region 706, 708 are tunneled through the MI-STP regions 702, 704. The tagged BPDUs 100 may be modified to the extent they are forwarded on links or trunks that are configured differently from the link or trunk on which they were received (e.g., from an ISL configured link to an IEEE 802.1Q configured trunk or vice versa). The tagged BPDUs 100 from PVST regions 706, 708 are similarly forwarded from all ports within the MI-STP regions 702, 704 that are in the forwarding or the learning spanning tree port states for spanning tree instance to which the VLAN of the tagged BPDU is mapped. MI-STP BPDUs 400 from MI-STP regions 702, 704 that enter PVST regions 706, 708 are discarded by the border devices in the PVST regions 706, 708 for the same reasons as described above for un-tagged BPDUs 100. Thus, the roots for the active topology associated with each VLAN designation in the PVST regions 706, 708 is in one of the PVST regions 706, 708. In addition, once a tagged message leaves an MI-STP region 702, 704 and enters a PVST region 706, 708, it cannot return to that MI-STP region 702, 704.

If a tagged BPDU 100 is to be forwarded within an MI-STP region 702, 704 across an ISL configured link, the VLAN designation from field 134 (FIG. 1) of the tagged BPDU 100 is used as the VLAN designation in the ISL header.

When a tagged BPDU 100 is received by a switch in the MI-STP region 702, the switch checks the BPDU's Topology Change (TC) flag 116. If it is set (indicating a change in the PVST region(s) 706, 708), the MI-STP switch determines to which spanning tree instance the VLAN designation of the BPDU 100 is mapped. If the MI-STP switch is the root for this spanning tree instance, it sets the TC flag in the flags field 434 in the configuration TLVs 428 of MI-STP BPDUs generated and transmitted for that instance. If the MI-STP switch is not the root for this instance, it does nothing in response to receiving the tagged BPDU 100 with its TC flag 116 set (other than tunneling the BPDU as described above). In this case, the MI-STP switch waits for the switch that is the root for the affected spanning tree instance to receive the tagged and TC flag asserted BPDU and act.

If the root of a spanning tree instance in the MI-STP region 702 is notified or otherwise detects a topology change for a given spanning tree instance, it preferably generates and sends one or more TCNs tagged with each of the VLAN designations mapped to the given spanning tree instance. For example, if the red, blue and yellow VLANs are mapped to the spanning tree instance for which the change is detected, the root generates and transmits one or more TCNs tagged with the red VLAN, one or more TCNs tagged with the blue VLAN, and one or more TCNs tagged with the yellow VLAN. These tagged TCNs are similarly tunneled through the MI-STP region 702 and reaches the PVST regions 706, 708. In the PVST regions 706, 708, the TCNs are propagated hop-by-hop to the root for each of the VLANs which respond by setting the TC flag field 116 of subsequent tagged BPDUs 100 sourced by the root(s).

The foregoing description has been directed to specific embodiments of this invention. It will be apparent, however, that other variations and modifications may be made to the described embodiments, with the attainment of some or all of their advantages. Therefore, it is an object of the appended claims to cover all such variations and modifications as come within the true spirit and scope of the invention.

What is claimed is:

1. A device comprising:
a plurality of ports for interconnecting the device to a computer network having a plurality of virtual local area networks (VLANs), each VLAN associated with a corresponding VLAN identifier (VID);
a spanning tree engine in communicating relationship with the plurality of ports, the spanning tree engine configured to exchange bridge protocol data unit (BPDU) messages with one or more neighboring devices to establish a plurality of loop-free paths through the computer network independent of any VLANs in the computer network, each loop-free path associated with a respective spanning tree instance identifier of a plurality of spanning tree instance identifiers, the spanning tree engine configured to elect a root bridge for each spanning tree instance identifier, each BPDU message to specify one of the spanning tree instance identifiers of the plurality of spanning tree instance identifiers and to include information regarding the loop-free path associated with that the specified spanning tree instance identifier;
mapping logic configured to map each VID to one spanning tree instance identifier of a loop free path, wherein the root bridge for a given spanning tree instance identifier specifies which VIDs are mapped to the given spanning tree instance identifier, wherein at least some VIDs are mapped to the same spanning tree instance identifier; and
at least one forwarding engine configured to forward a network message associated with a given VID from at least one port that is in the forwarding spanning tree port state for the spanning tree instance identifier to which the given VID is mapped.

2. An intermediate network device comprising:
a plurality of ports for interconnecting the intermediate network device to a computer network having a plurality of virtual local area networks (VLANs), each VLAN associated with a corresponding VLAN identifier (VID);
a spanning tree engine in communicating relationship with the plurality of ports wherein the spanning tree engine exchanges bridge protocol data unit (BPDU) messages with one or more other intermediate network devices to establish a plurality of loop-free paths through the computer network independent of any VLANs in the computer network, each loop-free path associated with a respective spanning tree instance identifier of a plurality of spanning tree instance identifiers, each of the plurality of spanning tree instance identifiers being a unique identifier that is not a VID, each BPDU message to specify one of the spanning tree instance identifiers of the plurality of spanning tree instance identifiers and to include information regarding the loop-free path associated with the specified spanning tree instance identifier; and
a VLAN association engine that maps each VID to a spanning tree instance identifier associated with a loop-free path so that data messages associated with a given VID follow at least part of the loop-free path established for the spanning tree instance identifier to which the given VID is mapped, wherein at least some VIDs are mapped to the same spanning tree instance identifier of the plurality of spanning tree instance identifiers.

3. The intermediate network device of claim 2 wherein at least some of the BPDU messages also include an indication of each VID that is mapped to the one of the spanning tree instance identifiers specified in the BPDU message.

4. The intermediate network device of claim 2 further comprising a plurality of state machines, each state machine associated with a spanning tree instance identifier and configured to transition the ports among a plurality of spanning tree port states for the respective spanning tree instance identifier, the spanning tree port states including a discarding state and a forwarding state.

5. The intermediate network device of claim 2 wherein each BPDU also specifies an identifier of a root bridge for the one of the spanning tree instance identifiers specified in the BPDU message.

6. The intermediate network device of claim 5 wherein the spanning tree instance identifier specified in a given BPDU message is part of the identifier of the root bridge.

7. The intermediate network device of claim 2 wherein each BPDU message further specifies the port from which the respective BPDU message is being sent.

8. The intermediate network device of claim 2 further comprising a table that is accessible by the VLAN association engine, the table configured with a mapping of VIDs to spanning tree instance identifiers.

9. The intermediate network device of claim 2 wherein the VLAN mapping engine is further configured to, upon detection that a given VID is mapped to more than one spanning tree instance identifier, block messages associated with the given VID from being forwarded by the intermediate network device.

10. The intermediate network device of claim 2 wherein
a subset of the ports are associated with a first VID, and
the spanning tree engine is further configured to exclude all ports not associated with the first VID when establishing the loop-free topology for the spanning tree instance identifier to which the first VID is mapped.

11. The intermediate network device of claim 2 wherein the mapping of the plurality of VIDs to respective spanning tree instance identifiers is specified by a network administrator.

12. A device comprising:
a plurality of ports for interconnecting the device to a computer network having a plurality of virtual local area networks (VLANs), each VLAN associated with a corresponding VLAN identifier (VID);
a spanning tree engine in communicating relationship with the plurality of ports, wherein the spanning tree engine exchanges bridge protocol data unit (BPDU) messages with one or more neighboring devices to establish a plurality of loop-free paths through the computer network independent of any VLANs in the computer network, each loop-free path associated with a respective spanning tree instance identifier of a plurality of spanning tree instance identifiers, each of the plurality of spanning tree instance identifiers being a unique identifier that is not a VID, each BPDU message to specify one of the spanning tree instance identifiers of the plurality of spanning tree instance identifiers and to include information regarding the loop-free path associated with the specified spanning tree instance identifier;
mapping logic configured to map each VID to one spanning tree instance identifier of a loop free path, wherein at least some VIDs are mapped to the same spanning tree instance identifier of the plurality of spanning tree instance identifiers; and
at least one forwarding engine configured to forward a network message associated with a given VID from at least one port that is in the forwarding spanning tree port state for the spanning tree instance identifier to which the given VID is mapped.

13. The device of claim 12 wherein at least some of the BPDU messages also include an indication of each VID that is mapped to the one of the spanning tree instance identifiers specified in the BPDU message.

14. The device of claim 12 wherein the at least one forwarding engine is further configured to, upon detection of a given VID being associated with more than one spanning tree instance identifier, ensure no messages associated with the given VID are forwarded by the device.

15. The device of claim 12 wherein the mapping logic is configured through network administrator action.

16. An apparatus comprising:
means for interconnecting the apparatus to a computer network;
means for exchanging bridge protocol data unit (BPDU) messages with one or more neighboring apparatus to establish a plurality of loop-free paths through the computer network independent of any virtual local area networks (VLANs) in the computer network, each loop-free path associated with a respective spanning tree instance identifier of a plurality of spanning tree instance identifiers, each of the plurality of spanning tree instance identifiers being a unique identifier that is not a VID, each BPDU message specifying one of the spanning tree instance identifiers of the plurality of spanning tree instance identifiers and including information regarding the loop-free path associated with the specified spanning tree instance identifier;
means for mapping each VID of the plurality of VIDs to a spanning tree instance identifier of a loop free path, wherein at least some VIDs are mapped to the same spanning tree instance identifier of the plurality of spanning tree instance identifiers; and
means for forwarding a network message associated with a given VID from at least one port that is in the forwarding spanning tree port state for the spanning tree instance identifier to which the given VID is mapped.

17. The apparatus of claim 16 wherein at least some of the BPDU messages also include an indication of each VID that is mapped to the one of the spanning tree instance identifiers specified in the BPDU message.

18. The apparatus of claim 16 further comprising means for electing a root bridge for each spanning tree instance identifier, the root bridge for a given spanning tree instance identifier being configured to specify which VIDs are mapped to the given spanning tree instance identifier.

19. The apparatus of claim 16 further comprising means for detecting a given VID being associated with more than one spanning tree instance identifier and ensuring that no messages associated with the given VID are forwarded by the apparatus.

20. A method comprising:
interconnecting a plurality of ports to a computer network having a plurality of virtual local area networks (VLANs), each VLAN associated with a corresponding VLAN Identifier (VID);
establishing a plurality of loop-free paths through the computer network independent of any VLANs in the computer network by exchanging bridge protocol data unit (BPDU) messages, each loop-free path associated with a respective spanning tree instance identifier of a plurality of spanning tree instance identifiers, each of the plurality of spanning tree instance identifiers being a unique identifier that is not a VID, each BPDU message specifying one of the spanning tree instance identifiers of the plurality of spanning tree instance identifiers and including information regarding the loop-free path associated with the specified spanning tree instance identifier;
mapping each VID to a spanning tree instance identifier, wherein at least some VIDs are mapped to the same spanning tree instance identifier of the plurality of spanning tree instance identifiers; and
forwarding a network message associated with a given VID from at least one port that is in the forwarding spanning tree port state for the spanning tree instance identifier to which the given VID is mapped.

21. The method of claim 20 wherein at least some of the BPDU messages also include an indication of each VID that is mapped to the one of the spanning tree instance identifiers specified in the BPDU message.

22. The method of claim 20 wherein, upon detection of a given VID being associated with more than one spanning tree instance identifier, no messages associated with the given VID are forwarded.

23. The method of claim 20 wherein the establishing elects a root bridge for each spanning tree instance identifier, and the root bridge for a given spanning tree instance identifier specifies which VIDs are mapped to the given spanning tree instance identifier.

24. A method comprising:
interconnecting a plurality of ports to a computer network having a plurality of virtual local area networks (VLANs), each VLAN associated with a corresponding VLAN Identifier (VID);
establishing a plurality of loop-free paths through the computer network independent of any VLANs in the computer network by exchanging bridge protocol data unit (BPDU) messages, each loop-free path associated with a respective spanning tree instance identifier of a plurality of spanning tree instance identifiers, the exchange of BPDU messages to elect a root bridge for each spanning tree instance identifier, wherein each BPDU message specifies one of the spanning tree instance identifiers of the plurality of spanning tree instance identifiers and includes information regarding the loop-free path associated with the specified spanning tree instance identifier;
mapping each VID to a spanning tree instance identifier based on a determination by the root bridge for a given spanning tree instance of which VIDs are to be mapped to the given spanning tree instance identifier, wherein at least some VIDs are mapped to the same spanning tree instance identifier;
forwarding a network message associated with a given VID from at least one port that is in the forwarding spanning tree port state for the spanning tree instance identifier to which the given VID is mapped.

* * * * *

UNITED STATES PATENT AND TRADEMARK OFFICE
CERTIFICATE OF CORRECTION

| | | |
|---|---|---|
| PATENT NO. | : 8,165,043 B2 | Page 1 of 1 |
| APPLICATION NO. | : 11/185057 | |
| DATED | : April 24, 2012 | |
| INVENTOR(S) | : Marco Di Benedetto et al. | |

It is certified that error appears in the above-identified patent and that said Letters Patent is hereby corrected as shown below:

Col. 6, line 23 should read: "each VLAN designation is then mapped ~~toga~~ to a single active ~~is~~"

Signed and Sealed this
Tenth Day of July, 2012

David J. Kappos
*Director of the United States Patent and Trademark Office*